United States Patent
Li et al.

(10) Patent No.: US 11,095,627 B2
(45) Date of Patent: Aug. 17, 2021

(54) MESSAGE DISPLAY METHOD, APPARATUS, AND DEVICE

(71) Applicant: Huawei Technologies Co., Ltd., Guangdong (CN)

(72) Inventors: Xiaojuan Li, Beijing (CN); Wenmei Gao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 705 days.

(21) Appl. No.: 15/524,238

(22) PCT Filed: Nov. 4, 2014

(86) PCT No.: PCT/CN2014/090280
§ 371 (c)(1),
(2) Date: May 3, 2017

(87) PCT Pub. No.: WO2016/070338
PCT Pub. Date: May 12, 2016

(65) Prior Publication Data
US 2017/0339119 A1 Nov. 23, 2017

(51) Int. Cl.
*H04L 29/06* (2006.01)
*H04L 12/58* (2006.01)

(52) U.S. Cl.
CPC ............ *H04L 63/061* (2013.01); *H04L 51/00* (2013.01); *H04L 51/04* (2013.01); *H04L 51/043* (2013.01); *H04L 51/24* (2013.01); *H04L 51/28* (2013.01)

(58) Field of Classification Search
CPC .......................... H04L 63/061; H04L 51/043
See application file for complete search history.

(56) References Cited

U.S. PATENT DOCUMENTS 8,412,785 B2 * 4/2013 Wu .................. H04L 29/06
709/206
9,166,935 B1 * 10/2015 Dodsworth ........... G06F 40/134
(Continued)

FOREIGN PATENT DOCUMENTS

CN 102333076 A 1/2012
CN 102609189 A * 7/2012
(Continued)

OTHER PUBLICATIONS

Google Translation of CN 102932238 (Year: 2013).*
(Continued)

*Primary Examiner* — Luu T Pham
*Assistant Examiner* — James J Wilcox
(74) *Attorney, Agent, or Firm* — Conley Rose, P.C.

(57) ABSTRACT

Embodiments of the present invention relate to the field of electronic information technologies, and disclose a message display method, apparatus, and device. The method in the embodiments of present invention includes: receiving first input information; extracting key information in the first input information, matching the key information and a user name, and determining a target user name; and binding the first input information and the target user name, and sending, to a receiver terminal, the first input information and the target user name that are bound, so that the receiver terminal displays a reminder message according to the target user name. The present invention is applicable to a scenario in which a user needs to quickly browse information.

12 Claims, 14 Drawing Sheets

(56) References Cited

U.S. PATENT DOCUMENTS

| | | | | |
|---|---|---|---|---|
| 9,819,753 B2* | 11/2017 | Hernandez | | G06Q 10/10 |
| 10,218,649 B2* | 2/2019 | Joo | | H04L 51/02 |
| 2005/0108341 A1* | 5/2005 | Mathew | | G06Q 10/06 |
| | | | | 709/206 |
| 2005/0193345 A1* | 9/2005 | Klassen | | H04L 51/24 |
| | | | | 715/751 |
| 2006/0031364 A1* | 2/2006 | Hamilton | | H04L 63/0823 |
| | | | | 709/206 |
| 2007/0050624 A1* | 3/2007 | Lord | | H04L 63/0823 |
| | | | | 713/168 |
| 2007/0073871 A1* | 3/2007 | Adams | | H04L 51/38 |
| | | | | 709/224 |
| 2007/0179776 A1* | 8/2007 | Segond | | G06F 40/211 |
| | | | | 704/9 |
| 2007/0201086 A1* | 8/2007 | Kim | | H04L 51/00 |
| | | | | 358/1.15 |
| 2008/0170786 A1* | 7/2008 | Tomizawa | | G06K 9/033 |
| | | | | 382/176 |
| 2008/0189399 A1* | 8/2008 | Quoc | | G06Q 10/10 |
| | | | | 709/223 |
| 2009/0119371 A1 | 5/2009 | Chang et al. | | |
| 2009/0306961 A1* | 12/2009 | Li | | G06F 40/284 |
| | | | | 704/9 |
| 2010/0030715 A1* | 2/2010 | Eustice | | G06Q 10/10 |
| | | | | 706/12 |
| 2010/0086110 A1* | 4/2010 | Boussard | | H04L 51/04 |
| | | | | 379/88.13 |
| 2010/0138507 A1* | 6/2010 | Sun | | H04L 51/04 |
| | | | | 709/206 |
| 2010/0235453 A1* | 9/2010 | Attanasio | | H04L 51/04 |
| | | | | 709/206 |
| 2011/0302263 A1* | 12/2011 | Quoc | | G06Q 50/01 |
| | | | | 709/206 |
| 2012/0297004 A1* | 11/2012 | Wijbrans | | H04L 51/38 |
| | | | | 709/206 |
| 2013/0144961 A1* | 6/2013 | Park | | H04L 67/325 |
| | | | | 709/206 |
| 2013/0159715 A1* | 6/2013 | Klassen | | H04L 63/061 |
| | | | | 713/171 |
| 2013/0173611 A1 | 7/2013 | Wald et al. | | |
| 2013/0179521 A1* | 7/2013 | Hu | | H04L 12/1822 |
| | | | | 709/206 |
| 2013/0325951 A1* | 12/2013 | Chakra | | H04L 51/24 |
| | | | | 709/204 |
| 2013/0339453 A1* | 12/2013 | Aggarwal | | H04W 4/021 |
| | | | | 709/206 |
| 2013/0346069 A1 | 12/2013 | Huang et al. | | |
| 2014/0006497 A1* | 1/2014 | Lopyrev | | H04L 12/1895 |
| | | | | 709/204 |
| 2014/0074844 A1* | 3/2014 | Subramanian | | G06Q 10/10 |
| | | | | 707/739 |
| 2014/0089436 A1* | 3/2014 | Zhang | | H04L 51/30 |
| | | | | 709/206 |
| 2014/0204824 A1* | 7/2014 | Chen | | H04W 4/06 |
| | | | | 370/312 |
| 2014/0280525 A1* | 9/2014 | McCandless | | G06F 16/335 |
| | | | | 709/204 |
| 2015/0234872 A1* | 8/2015 | Lijima | | G06F 16/248 |
| | | | | 707/741 |
| 2016/0127292 A1* | 5/2016 | Birger | | H04W 4/14 |
| | | | | 709/206 |
| 2017/0177728 A1 | 6/2017 | Yu | | |
| 2018/0152399 A1* | 5/2018 | Ma | | H04W 4/12 |

FOREIGN PATENT DOCUMENTS

| | | | | |
|---|---|---|---|---|
| CN | 102609189 A | | 7/2012 | |
| CN | 102932238 A | * | 2/2013 | |
| CN | 102932238 A | | 2/2013 | |
| CN | 102970210 A | | 3/2013 | |
| CN | 103514165 A | * | 1/2014 | ......... H04L 63/061 |
| CN | 103514165 A | | 1/2014 | |
| CN | 103580987 A | | 2/2014 | |
| CN | 103838834 A | | 6/2014 | |
| CN | 104104580 A | | 10/2014 | |
| JP | 2004227313 A | | 8/2004 | |
| WO | 2013135130 A1 | | 9/2013 | |

OTHER PUBLICATIONS

Google Translation of CN 102609189 (Year: 2012).*
Google Translation of CN103514165 (Year: 2012).*
The First Office Action for Publication No. 201480066733.3, The State Intellectual Property Office of People's Republic of China, 2014.*
Gainaru et al "Toolkit for Automatic Analysis of Chat Conversations," IEEE, pp. 99-102, (Year: 2010).*
Forsyth et al "Lexical and Discourse Analysis of Online Chat Dialog," IEEE, pp. 19-26 (Year: 2007).*
Office Action issued in Chinese Application No. 201480066733.3 dated Apr. 9, 2019, 7 pages.
Cao Yue-qin, "Topic Thread Detection Algorithm in Dynamic Text Flow", Computer Engineering, vol. 37, No. 24. Dec. 2011, 17 pages.

* cited by examiner

MESSAGE DISPLAY METHOD, APPARATUS, AND DEVICE

CROSS REFERENCE TO RELATED APPLICATIONS

The present application claims priority under 35 U.S.C. § 365 to International Patent Application No. PCT/CN2014/090280 filed Nov. 4, 2014 which is incorporated herein by reference into the present disclosure as if fully set forth herein.

TECHNICAL FIELD

The present invention relates to the field of electronic information technologies, and in particular, to a message display method, apparatus, and device.

BACKGROUND

With development of communications network technologies, many IM (Instant Messaging, instant messaging) applications, such as QQ, WeChat, and MiTalk, supporting online message transmission constantly spring up. Most IM applications all support functions, such as an online text chat and an online voice chat. For the online text chat and the online voice chat, a one-to-one chat between terminal users may be implemented, or a chat among multiple terminal users in a group may be implemented.

In the prior art, when multiple terminal users in a group chat online, each terminal user not only may obtain information sent by the terminal user, but also may obtain information sent by another terminal user in the group.

However, when there is a relatively large quantity of persons in the group, a large amount of unread information usually exists. When intending to obtain information related to a terminal user, the terminal user cannot obtain the information related to the terminal user unless the terminal user sequentially reads the large amount of unread information. The terminal user sequentially reads unread information in the large amount of unread information, until information related to the terminal user is found, which takes the user a large amount of time. Consequently, it is difficult for the user to quickly obtain the information related to the user from the large amount of unread information.

SUMMARY

Embodiments of the present invention provide a message display method, apparatus, and device, so as to enable a user to quickly obtain information related to the user from a large amount of unread information according to a reminder message, reducing a time taken by the terminal user to search the large amount of unread information for the information related to the terminal user.

To achieve the foregoing objective, the following technical solutions are used in the embodiments of the present invention:

According to a first aspect, an embodiment of the present invention provides a message display method, including:

receiving, by the sender terminal, first input information;

extracting, by the sender terminal, key information from the first input information, and matching the key information in the first input information and a user name in a communication list;

determining, by the sender terminal, a target user name, where the target user name is a user name that successfully matches the key information in the first input information; and binding, by the sender terminal, the first input information and the target user name, and sending, to a receiver terminal, the first input information and the target user name that are bound, so that the receiver terminal displays a reminder message according to the target user name, where the reminder message includes the target user name or identification information corresponding to the target user name.

With reference to the first aspect, in a first possible implementation manner, the key information includes name information or appellation information.

With reference to the first possible implementation manner of the first aspect, in a second possible implementation manner, the extracting, by the sender terminal, key information from the first input information, and matching the key information in the first input information and a user name in a communication list includes:

performing, by the sender terminal, semantic analysis on the key information extracted from the first input information, to extract the name information from the key information; and detecting, by the sender terminal, whether the name information is consistent with the user name in the communication list; and the determining, by the sender terminal, a target user name includes:

determining, by the sender terminal, the user name in the communication list that is consistent with the name information as the target user name.

With reference to the first possible implementation manner of the first aspect, in a third possible implementation manner, before the receiving, by the sender terminal, first input information, the method includes:

obtaining, by the sender terminal, appellation information in historical input information and a user name corresponding to the historical input information;

establishing, by the sender terminal, a correspondence between the appellation information in the historical input information and the user name according to the appellation information in the historical input information and the user name corresponding to the historical input information; and storing, by the sender terminal, the correspondence.

With reference to the third possible implementation manner of the first aspect, in a fourth possible implementation manner, the correspondence is stored in the communication list;

the extracting, by the sender terminal, key information from the first input information, and matching the key information in the first input information and a user name in a communication list includes:

performing, by the sender terminal, semantic analysis on the key information extracted from the first input information, to extract the appellation information from the key information; and detecting, by the sender terminal according to the appellation information in the first input information, whether a user name that corresponds to the appellation information in the first input information exists in the communication list; and the determining, by the sender terminal, a target user name includes:

determining, by the sender terminal, the user name that corresponds to the appellation information in the first input information as the target user name.

With reference to the second or the fourth possible implementation manner of the first aspect, in a fifth possible implementation manner, after the receiving, by the sender terminal, first input information, the method further includes:

receiving, by the sender terminal, second input information, and extracting key information from the second input information;

performing, by the sender terminal, semantic correlation analysis on the second input information and the first input information by using the name information or the appellation information in the first input information and the key information in the second input information;

when the second input information is semantically correlated with the first input information successfully, determining, by the sender terminal, that the key information in the second input information successfully matches the target user name; and binding, by the sender terminal, the second input information and the target user name, and sending, to the receiver terminal, the second input information and the target user name that are bound, so that the receiver terminal displays a reminder message according to the target user name.

According to a second aspect, an embodiment of the present invention provides a message display method, applied to a receiver terminal and including:

receiving, by the receiver terminal, first delivered information;

extracting, by the receiver terminal, key information from the first delivered information, and matching the key information in the first delivered information and a user name that corresponds to the receiver terminal;

binding, by the receiver terminal, the user name that corresponds to the receiver terminal and the first delivered information that successfully match each other; and displaying, by the receiver terminal, a reminder message according to the user name corresponding to the receiver terminal, where the reminder message includes the user name corresponding to the receiver terminal or identification information corresponding to the user name corresponding to the receiver terminal.

With reference to the second aspect, in a first possible implementation manner, the key information includes name information or appellation information.

With reference to the first possible implementation manner of the second aspect, in a second possible implementation manner, the extracting, by the receiver terminal, key information from the first delivered information, and matching the key information in the first delivered information and a user name that corresponds to the receiver terminal includes:

performing, by the receiver terminal, semantic analysis on the key information extracted from the first delivered information, to extract the name information from the key information; and detecting, by the receiver terminal, whether the name information is consistent with the user name corresponding to the receiver terminal; and the binding, by the receiver terminal, the user name that corresponds to the receiver terminal and the first delivered information that successfully match each other includes:

when the name information in the first delivered information is consistent with the user name corresponding to the receiver terminal, binding, by the receiver terminal, the first delivered information and the user name that corresponds to the receiver terminal.

With reference to the first possible implementation manner of the second aspect, in a third possible implementation manner, before the receiving, by the receiver terminal, first delivered information, the method includes:

obtaining, by the receiver terminal, appellation information in historical delivered information sent to the receiver terminal;

establishing, by the receiver terminal according to the appellation information in the historical delivered information, a correspondence between the appellation information in the historical delivered information and the user name that corresponds to the receiver terminal; and storing, by the receiver terminal, the correspondence.

With reference to the third possible implementation manner of the second aspect, in a fourth possible implementation manner, the extracting, by the receiver terminal, key information from the first delivered information, and matching the key information in the first delivered information and a user name that corresponds to the receiver terminal includes:

performing, by the receiver terminal, semantic analysis on the key information extracted from the first delivered information, to extract the appellation information from the key information; and detecting, by the receiver terminal according to the appellation information in the first delivered information, whether the appellation information in the first delivered information corresponds to the user name corresponding to the receiver terminal; and the binding, by the receiver terminal, the user name that corresponds to the receiver terminal and the first delivered information that successfully match each other includes:

when the appellation information in the first delivered information corresponds to the user name corresponding to the receiver terminal, binding, by the receiver terminal, the first delivered information and the user name that corresponds to the receiver terminal.

With reference to the second or the fourth possible implementation manner of the second aspect, in a fifth possible implementation manner, when the first delivered information successfully matches the user name corresponding to the receiver terminal, after the receiving, by the receiver terminal, first delivered information, the method further includes:

receiving, by the receiver terminal, second delivered information, and extracting key information from the second delivered information;

performing, by the receiver terminal, semantic correlation analysis on the second delivered information and the first delivered information by using the name information or the appellation information in the first delivered information and the key information in the second delivered information; and when the second delivered information is semantically correlated with the first delivered information successfully, binding, by the receiver terminal, the user name corresponding to the receiver terminal and the second delivered information, and displaying a reminder message.

According to a third aspect, an embodiment of the present invention provides a message display apparatus, including:

a first receiving module, configured to receive first input information;

a first matching module, configured to: extract key information from the first input information, and match between the key information in the first input information and a user name in a communication list;

a first determining module, configured to determine a target user name, where the target user name is a user name that successfully matches the key information in the first input information; and a first sending module, configured to: bind the first input information and the target user name, and send, to a receiver terminal, the first input information and the target user name that are bound, so that the receiver terminal displays a reminder message according to the target user name, where the reminder message includes the target user name or identification information corresponding to the target user name.

With reference to the third aspect, in a first possible implementation manner, the key information includes name information or appellation information.

With reference to the first possible implementation manner of the third aspect, in a second possible implementation manner, the first matching module includes:

a first extraction unit, configured to: perform semantic analysis on the key information extracted from the first input information, to extract the name information from the key information; and a first detection unit, configured to detect whether the name information is consistent with the user name in the communication list; and the first determining module includes:

a first determining unit, configured to determine the user name in the communication list that is consistent with the name information as the target user name.

With reference to the first possible implementation manner of the third aspect, in a third possible implementation manner, the apparatus further includes:

a first obtaining module, configured to obtain appellation information in historical input information and a user name corresponding to the historical input information;

a first establishment module, configured to establish a correspondence between the appellation information in the historical input information and the user name according to the appellation information in the historical input information and the user name corresponding to the historical input information; and a first storing module, configured to store the correspondence.

With reference to the third possible implementation manner of the third aspect, in a fourth possible implementation manner, the correspondence is stored in the communication list;

the first matching module includes:

a second extraction unit, configured to: perform semantic analysis on the key information extracted from the first input information, to extract the appellation information from the key information; and a second detection unit, configured to detect, according to the appellation information in the first input information, whether a user name that corresponds to the appellation information in the first input information exists in the communication list; and the first determining module includes:

a second determining unit, configured to determine the user name that corresponds to the appellation information in the first input information as the target user name.

With reference to the second or the fourth possible implementation manner of the third aspect, in a fifth possible implementation manner, the apparatus further includes:

a second receiving module, configured to receive second input information, where the second input information is input information received after the first input information is received;

a first correlation module, configured to perform semantic correlation analysis on the second input information and the first input information by using the name information or the appellation information in the first input information and key information in the second input information;

a second determining module, configured to: when the second input information is semantically correlated with the first input information successfully, determine that the key information in the second input information successfully matches the target user name; and a second sending module, configured to: bind the second input information and the target user name, and send, to the receiver terminal, the second input information and the target user name that are bound, so that the receiver terminal displays a reminder message according to the target user name.

According to a fourth aspect, an embodiment of the present invention provides a message display apparatus, including:

a third receiving module, configured to receive first delivered information;

a second matching module, configured to: extract key information from the first delivered information, and match between the key information in the first delivered information and a user name that corresponds to a receiver terminal;

a first binding module, configured to bind the user name that corresponds to the receiver terminal and the first delivered information that successfully match each other; and a display module, configured to display a reminder message according to the user name corresponding to the receiver terminal, where the reminder message includes the user name corresponding to the receiver terminal or identification information corresponding to the user name corresponding to the receiver terminal.

With reference to the fourth aspect, in a first possible implementation manner, the key information includes name information or appellation information.

With reference to the first possible implementation manner of the fourth aspect, in a second possible implementation manner, the second matching module includes:

a third extraction unit, configured to: perform semantic analysis on the key information extracted from the first delivered information, to extract the name information from the key information; and a third detection unit, configured to detect whether the name information is consistent with the user name corresponding to the receiver terminal; and the first binding module includes:

a first binding unit, configured to: when the name information in the first delivered information is consistent with the user name corresponding to the receiver terminal, bind the first delivered information and the user name that corresponds to the receiver terminal.

With reference to the first possible implementation manner of the fourth aspect, in a third possible implementation manner, the apparatus further includes:

a second obtaining module, configured to obtain appellation information in historical delivered information sent to the receiver terminal;

a second establishment module, configured to establish, according to the appellation information in the historical delivered information, a correspondence between the appellation information in the historical delivered information and the user name that corresponds to the receiver terminal; and a second storing module, configured to store the correspondence.

With reference to the third possible implementation manner of the fourth aspect, in a fourth possible implementation manner, the second matching module includes:

a fourth extraction unit, configured to: perform semantic analysis on the key information extracted from the first delivered information, to extract the appellation information from the key information; and a fourth detection unit, configured to detect, according to the appellation information in the first delivered information, whether the appellation information in the first delivered information corresponds to the user name corresponding to the receiver terminal; and the first binding module includes:

a second binding unit, configured to: when the appellation information in the first delivered information corresponds to the user name corresponding to the receiver terminal, bind the first delivered information and the user name that corresponds to the receiver terminal.

With reference to the second or the fourth possible implementation manner of the fourth aspect, in a fifth possible implementation manner, when the first delivered information successfully matches the user name corresponding to the receiver terminal, the apparatus further includes:

a fourth receiving module, configured to: receive second delivered information, and extract key information from the second delivered information, where the second delivered information is delivered information received after the first delivered information is received;

a second correlation module, configured to perform semantic correlation analysis on the second delivered information and the first delivered information by using the name information or the appellation information in the first delivered information and the key information in the second delivered information; and a second binding module, configured to: when the second delivered information is semantically correlated with the first delivered information successfully, bind the user name corresponding to the receiver terminal and the second delivered information, and display a reminder message.

According to a fifth aspect, an embodiment of the present invention provides a message display device, where the device includes at least an input unit, a processing unit, and a communications unit, where the input unit is configured to receive first input information;

the processing unit is configured to: extract key information from the first input information, and match between the key information in the first input information and a user name in a communication list; and configured to determine a target user name, where the target user name is a user name that successfully matches the key information in the first input information; and the communications unit is configured to: bind the first input information and the target user name, and send, to a receiver terminal, the first input information and the target user name that are bound, so that the receiver terminal displays a reminder message according to the target user name, where the reminder message includes the target user name or identification information corresponding to the target user name.

With reference to the fifth aspect, in a first possible implementation manner, the key information includes name information or appellation information.

With reference to the first possible implementation manner of the fifth aspect, in a second possible implementation manner, the processing unit is further configured to: perform semantic analysis on the key information extracted from the first input information, to extract the name information from the key information;

configured to detect whether the name information is consistent with the user name in the communication list; and configured to determine the user name in the communication list that is consistent with the name information as the target user name.

With reference to the first possible implementation manner of the fifth aspect, in a third possible implementation manner, the device further includes a storage unit, and the processing unit is further configured to: obtain appellation information in historical input information and a user name corresponding to the historical input information; and configured to establish a correspondence between the appellation information in the historical input information and the user name according to the appellation information in the historical input information and the user name corresponding to the historical input information; and the storage unit is configured to store the correspondence.

With reference to the third possible implementation manner of the fifth aspect, in a fourth possible implementation manner, the correspondence is stored in the communication list;

the processing unit is further configured to: perform semantic analysis on the key information extracted from the first input information, to extract the appellation information from the key information; and configured to detect, according to the appellation information in the first input information, whether a user name that corresponds to the appellation information in the first input information exists in the communication list; and configured to determine the user name that corresponds to the appellation information in the first input information as the target user name.

With reference to the second or the fourth possible implementation manner of the fifth aspect, in a fifth possible implementation manner, the input unit is further configured to: receive second input information, and extract key information from the second input information, where the second input information is input information received after the first input information is received;

the processing unit is further configured to perform semantic correlation analysis on the second input information and the first input information by using the name information or the appellation information in the first input information and the key information in the second input information; and configured to: when the second input information is semantically correlated with the first input information successfully, determine that the key information in the second input information successfully matches the target user name; and the communications unit is further configured to: bind the second input information and the target user name, and send, to the receiver terminal, the second input information and the target user name that are bound, so that the receiver terminal displays a reminder message according to the target user name.

According to a sixth aspect, an embodiment of the present invention provides a message display method, where the device includes at least a processing unit and a communications unit, where the communications unit is configured to receive first delivered information; and the processing unit is configured to: extract key information from the first delivered information, and match between the key information in the first delivered information and a user name that corresponds to a receiver terminal;

configured to bind the user name that corresponds to the receiver terminal and the first delivered information that successfully match each other; and configured to display a reminder message according to the user name corresponding to the receiver terminal, where the reminder message includes the user name corresponding to the receiver terminal or identification information corresponding to the user name corresponding to the receiver terminal.

With reference to the sixth aspect, in a first possible implementation manner, the key information includes name information or appellation information.

With reference to the first possible implementation manner of the sixth aspect, in a second possible implementation manner, the processing unit is further configured to: perform semantic analysis on the key information extracted from the first delivered information, to extract the name information from the key information;

configured to detect whether the name information is consistent with the user name corresponding to the receiver terminal; and configured to: when the name information in the first delivered information is consistent with the user name corresponding to the receiver terminal, bind the first delivered information and the user name that corresponds to the receiver terminal.

With reference to the first possible implementation manner of the sixth aspect, in a third possible implementation manner, the device further includes a storage unit, where the processing unit is further configured to: obtain appellation information in historical delivered information sent to the receiver terminal; and configured to establish, according to the appellation information in the historical delivered information, a correspondence between the appellation information in the historical delivered information and the user name that corresponds to the receiver terminal; and the storage unit is configured to store the correspondence.

With reference to the third possible implementation manner of the sixth aspect, in a fourth possible implementation manner, the processing unit is further configured to: perform semantic analysis on the key information extracted from the first input information, to extract the appellation information from the key information;

configured to detect, according to the appellation information in the first delivered information, whether the appellation information in the first delivered information corresponds to the user name corresponding to the receiver terminal; and configured to: when the appellation information in the first delivered information corresponds to the user name corresponding to the receiver terminal, bind the first delivered information and the user name that corresponds to the receiver terminal.

With reference to the second or the fourth possible implementation manner of the sixth aspect, in a fifth possible implementation manner, when the first delivered information successfully matches the user name corresponding to the receiver terminal, the communications unit is further configured to: receive second delivered information, and extract key information from the second delivered information, where the second delivered information is delivered information received after the first delivered information is received; and the processing unit is further configured to perform semantic correlation analysis on the second delivered information and the first delivered information by using the name information or the appellation information in the first delivered information and the key information in the second delivered information; and configured to: when the second delivered information is semantically correlated with the first delivered information successfully, bind the user name corresponding to the receiver terminal and the second delivered information, and display a reminder message.

By means of the message display method, apparatus, and device that are provided in the embodiments of the present invention, key information in input information can be extracted, the key information is matched with a user name in a communication list, the input information and the user name successfully matching the key information in the input information are bound, and the successfully matched user name and the input information that are bound are sent to a receiver terminal, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. Reminded by the reminder message, the user can quickly obtain the input information related to the user from the large amount of unread information, thereby greatly reducing a time taken by the user to search the large amount of unread information for the input information related to the user.

By means of the message display method, apparatus, and device that are further provided in the embodiments of the present invention, key information in delivered information can be extracted, the key information is matched with a user name that corresponds to a receiver terminal, the delivered information successfully matching the user name corresponding to the receiver terminal is bound to the user name corresponding to the receiver terminal, and the receiver terminal displays a reminder message. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
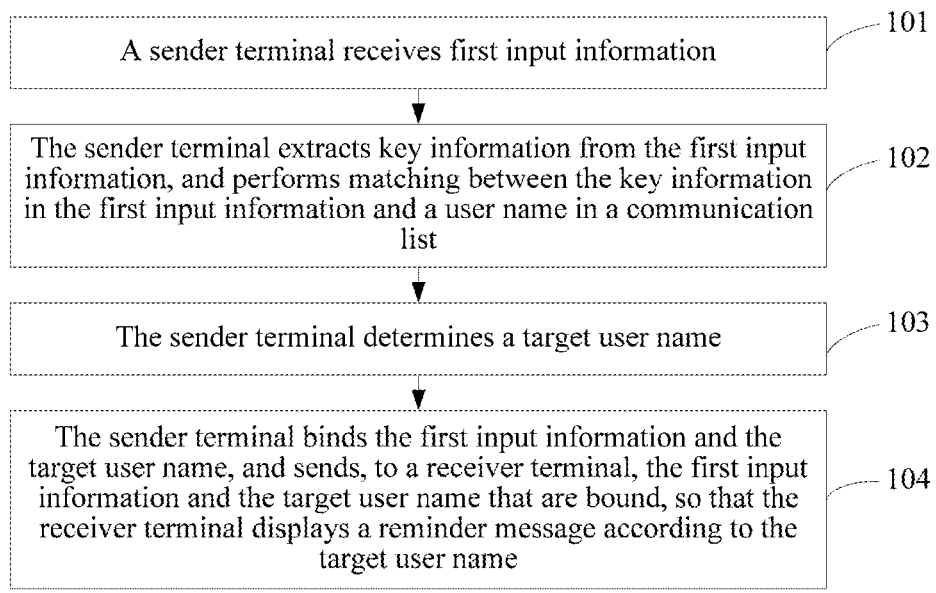
FIG. 1 is a flowchart of a message display method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that some procedures described below include multiple operations performed in a particular order. However, it should be clearly learned that these operations may not be performed in the order in which these operations are performed in the specification or may be performed concurrently. Sequence numbers, such as 101 and 102, of the operations are merely used to distinguish different operations, and the sequence numbers do not represent any execution order. In addition, these procedures may include more or fewer operations, and these operations may be performed in an order or may be performed concurrently.

It should be noted that descriptions of "first", "second", and the like in the specification are used to distinguish different information, devices, modules, and the like, and do not indicate a sequence and do not limit that "first" and "second" are different types either. "When" in the specification represents that a condition and a state are met, and includes meanings, such as "if", "after a condition is met", or "determining succeeds". "Message" is a carrier carrying several pieces of information, and includes multiple forms, such as signaling, a communication signal, and a data message.

Technical solutions provided in the embodiments of the present invention are mainly applied to a group chat scenario in an instant messaging application. In the group chat scenario, each terminal in a group may be used as a sender terminal to send input information, or may be used as a receiver terminal to receive input information sent by a server. In addition, when a terminal in the group sends input information, all other terminals in the group may receive the input information. A sender terminal may receive input information that is entered by a user, and send the input information to a server. The server then sends the input information to a receiver terminal.

The input information is received, matching is performed between the input information and a user name in an application communication list, to obtain the user name successfully matching the input information, and the successfully matched user name and the input information are bound, and are sent to the receiver terminal in the group. The foregoing procedure may be completed by the sender terminal, or may be completed by a server on a network side. The sender terminal and the receiver terminal include, but are not limited to, user equipment's, such as a smartphone, a tablet computer, and a wearable device having a display function, for example, wearable glasses and a wearable watch. The input information may be information such as voice input information or text input information.

An embodiment of the present invention provides a message display method, applied to a receiver terminal, and is further applicable to a server on a network side. A sender terminal receives first input information, extracts key information from the first input information, matches the key information in the first input information and a user name in a communication list, determines a target user name, binds the first input information and the target user name, and sends, to a receiver terminal, the first input information and the target user name that are bound. Alternatively, the server on the network side receives first input information, extracts key information from the first input information, matches the key information in the first input information and a user name in a communication list, determines a target user name, binds the first input information and the target user name, and sends, to a receiver terminal, the first input information and the target user name that are bound. As shown in FIG. 1, the method includes the following steps.

101: The sender terminal receives the first input information.

The sender terminal or the server on the network side receives the first input information, that is, the first input information is entered by a user, or is sent by the sender terminal. The first input information received by the sender terminal is entered by the user to the sender terminal. The first input information received by the server on the network side is sent by the sender terminal to the server on the network side. The first input information may be voice input information, or may be text input information.

102: The sender terminal extracts key information from the first input information, and matches the key information in the first input information and a user name in a communication list.

The communication list is a communication list in an instant messaging application, that is, a contact list, a friend list, or the like. For example, when a user uses QQ, a corresponding communication list is a QQ friend list; when the user uses WeChat, a corresponding communication list is a contact list in WeChat. The communication list includes a user name in the communication list of the instant messaging application. When the sender terminal receives input information that is entered by the user, the sender terminal extracts key information from the input information. Specifically, the sender terminal performs word segmentation on the first input information, to obtain a keyword, that is, key information, generated after the first input information is segmented, and matches the key information and a user name in a communication list in an instant messaging application in which the input information exists, that is, detects whether the input information is related to the user name in the communication list. Alternatively, the sender terminal receives input information that is entered by the user and sends the input information to the server on the network side. The server on the network side performs word segmentation on the input information, to obtain a keyword, that is, key information, generated after the input information is segmented, and matches the key information and a user name in a communication list in an instant messaging application in which the input information exists, that is, detects whether the input information is related to the user name in the communication list. For example, the communication list is a QQ friend list, and the key information extracted from the input information is matched with a user name in the QQ friend list.

It should be noted that the key information is one type of word or a set of multiple types of words, such as a verb, a noun, a pronoun, and an adjective. For example, the first input information is "Li Si, hand over the business proposal to me tomorrow", word segmentation is performed on the first input information, to obtain key information, such as "Li Si", "tomorrow", "business proposal", and "me", and matching is sequentially performed between the key information and the user name in the communication list.

103: The sender terminal determines a target user name.

The target user name is a user name that successfully matches the key information in the first input information. It should be noted that, according to a specific method for matching the key information and the user name in the application communication list, the sender terminal or the server on the network side may extract a noun from the key information in the input information, use the noun as an identifier of the user, and detect whether the noun is consistent with the user name in the communication list, or store, in the communication list, a correspondence between a noun used as an identifier of the user and the user name and detect whether a user name that corresponds to the noun extracted from the key information in the input information exists in the communication list, to determine whether a user name that successfully matches the key information in the input information exists, that is, whether the target user name exists.

104: The sender terminal binds the first input information and the target user name, and sends, to a receiver terminal, the first input information and the target user name that are bound, so that the receiver terminal displays a reminder message according to the target user name.

The receiver terminal is a receiver terminal in the group. The sender terminal receives the first input information, binds the first input information and the target user name, and sends, to the receiver terminal by using the server on the network side, the first input information and the target user name that are bound. Alternatively, the server on the network side receives the first input information, binds the first input information and the target user name, and sends, to the receiver terminal, the first input information and the target user name that are bound. It should be noted that, the first input information and the target user name are bound, so that the target user name is attached to the first input information, and when the first input information is transferred, the target user name is transferred along with the first input information.

Figure 1A:
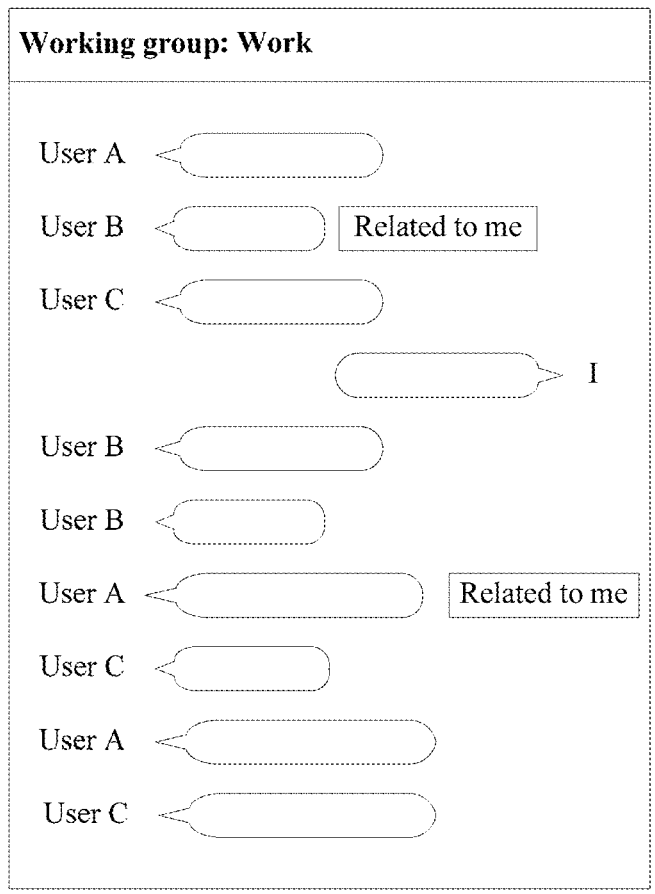
FIG. 1a is a schematic diagram of an example of an interface displaying a reminder message according to an embodiment of the present invention.
Figure 1B:
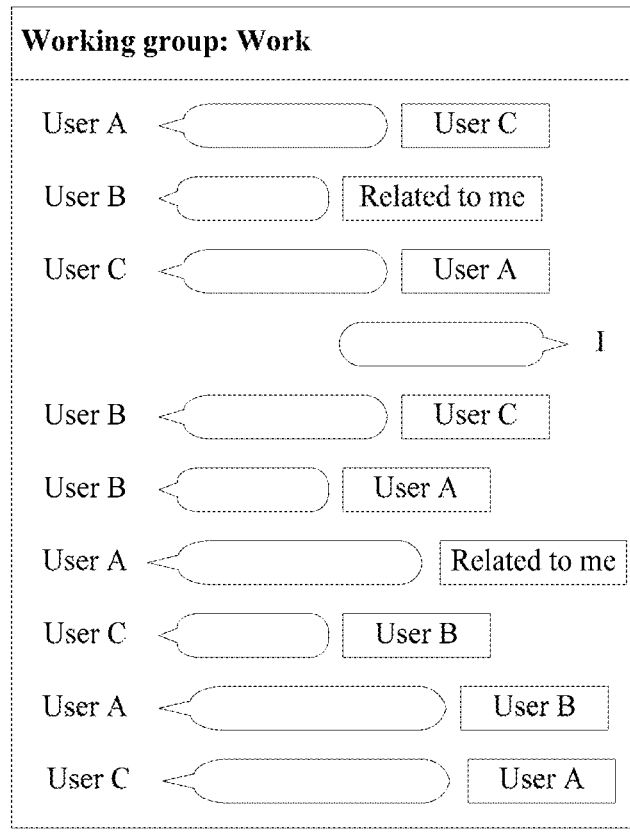
FIG. 1b is a schematic diagram of an example of another interface displaying a reminder message according to an embodiment of the present invention.

The receiver terminal receives and displays the first input information, and displays, according to the target user name, a reminder message while displaying the first input information, where the reminder message includes the target user name or identification information corresponding to the target user name. Specifically, the reminder message is generated by the receiver terminal according to the target user name bound to the first input information, and the reminder message is used to remind that the displayed input information is related to the user name successfully matching the key information in the input information. The reminder message may be displayed only on the receiver terminal corresponding to the user name successfully matching the input information. For example, as shown in FIG. 1a, on a chat interface of a working group on the receiver terminal corresponding to the user name bound to the input information, a reminder message having words of "related to me" is displayed while the input information related to the user name corresponding to the receiver terminal is displayed. Alternatively, the reminder message may be displayed on each receiver terminal in a group, and the reminder message is used to indicate that the input information is related to a user. For example, as shown in FIG. 1b, on a chat interface of a terminal in a working group, a user name related to each input information is displayed behind each piece of the received input information, "user C" is displayed behind a first piece of input information to indicate that the first piece of input information is related to user C, and "user A" is displayed behind a third piece of input information to indicate that the third piece of input information is related to user A.

It should be noted that besides being displayed around the input information by using a text or another identifier, the reminder message may be further implemented in another form. When the input information is text information, a word in the input information related to "me" may be made bold, or a word size is increased, or a word color is changed. When the input information is voice information, a form of an information box of the input information related to "me" may be changed, or a background color of an information box of the input information related to "me" may be changed. A form of the reminder message is not limited herein. The user browses the reminder message, so that input information related to the user can be obtained quickly and definitely.

It should be noted that, the receiver terminal may further display an amount reminder message used to remind the user of an amount of input information related to "me", for example, display words of, for example, "there are five pieces of information related to me". The receiver terminal may further receive a triggering operation of the user on the amount reminder message, and lock a display interface to a location of the input information related to "me". For example, the display interface may display six pieces of continuous information at the same time, and there are 30 pieces of unread information in a group, where the fourth and the eighth pieces of input information are related to "me". After the user triggers the amount reminder message, the display interface displays the third to the eighth pieces of information in the group.

In addition, it should be noted that, when the input information entered by the user or the input information sent by the sender terminal is received, the sender terminal may display a user name list, where the user name list includes the user name in the communication list. The sender terminal or the server on the network side may also select, according to a selection instruction sent by the user, the user name in the user name list as the user name bound to the input information. For example, after the user enters the input information, a mobile phone displays a user name list, where the user name list includes three user names: "Zhang San", "Li Si", and "Zhao Wu". If the user selects "Zhang San", the mobile phone uses, according to a selection instruction of the user, "Zhang San" as the user name bound to the input information. In a subsequent process, "Zhang San" and the input information are bound, and are sent to the receiver terminal.

In addition, when the user enters the input information, the sender terminal reminds the user to manually enter the user name in the communication list, and the sender terminal or the server on the network side may further receive the user name, which is entered by the user, in the communication list, and use the user name, which is entered by the user, in the communication list as the user name bound to the input information. For example, a user name "Zhang San" exists in the communication list. After entering the input information, the user directly enters the user name "Zhang San". The terminal uses the user name "Zhang San" as the user name bound to the input information. In a subsequent process, "Zhang San" and the input information are bound, and are sent to the receiver terminal.

By means of the message display method provided in this embodiment of the present invention, key information in input information can be extracted, the key information is matched with a user name in a communication list, the input information and the user name successfully matching the key information in the input information are bound, and the successfully matched user name and the input information that are bound are sent to a receiver terminal, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user.

Figure 2:
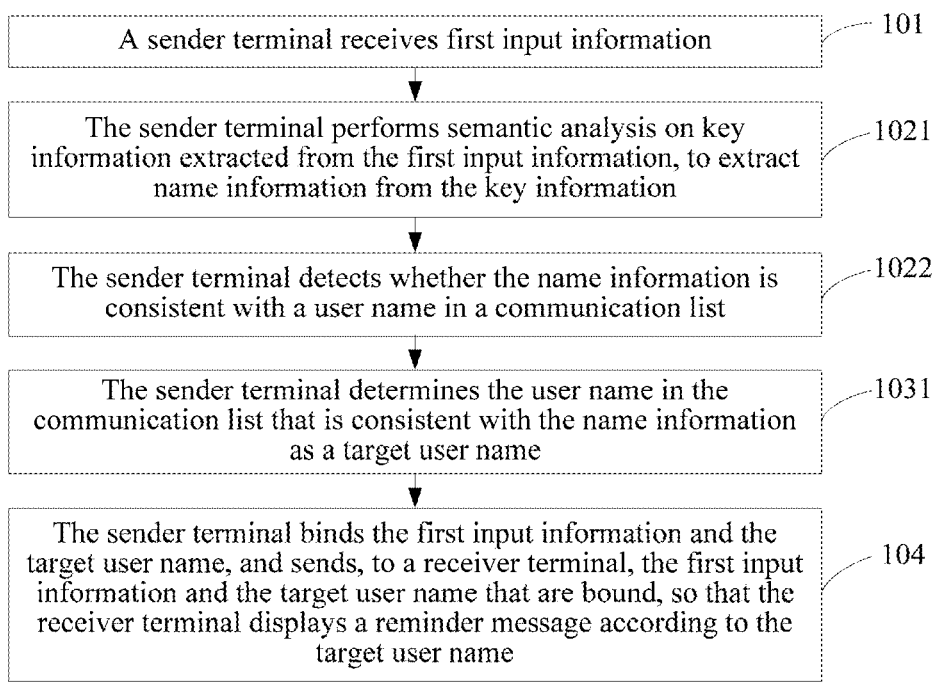
FIG. 2 is a flowchart of an implementation manner of a message display method according to an embodiment of the present invention.

Further, the key information includes name information or appellation information. The name information is usually a name of a person, and the appellation information is usually an appellation or a nickname of a person. In this embodiment, matching is mainly performed between the name information and the user name in the communication list, and the successfully matched user name is obtained. Based on the solution shown in FIG. 1, an embodiment of the present invention further provides a specific solution of the message display method, to further detail a process of performing 102 and 103 that are shown in FIG. 1. 102 may be specifically implemented as 1021 and 1022, and 103 may be specifically implemented as 1031. As shown in FIG. 2, the specific solution includes:

1021: The sender terminal performs semantic analysis on the key information extracted from the first input information, to extract name information from the key information.

The key information extracted from the input information is extracted in a form of a keyword. Therefore, the key information may be one type of word or a set of multiple types of words, such as a noun, a verb, a pronoun, and an adjective, and the name information is usually a name of a person. The sender terminal or the server on the network side performs semantic analysis on the first input information. Specifically, the sender terminal or the server on the network side may obtain name information from the obtained key information, that is, the keyword, according to grammar. For example, the first input information is "Li Si, what are you doing?". Then, key information that is words such as "Li Si", "you", and "what" is extracted. After semantic analysis, name information that may be extracted from the key information is "Li Si".

1022: The sender terminal detects whether the name information is consistent with a user name in the communication list.

After the name information is obtained, the name information is compared with the user name in the communication list, and whether the name information is consistent with the user name in the communication list is detected. For example, whether the name information is the same as the user name in the communication list is detected.

1031: The sender terminal determines the user name in the communication list that is consistent with the name information as a target user name.

When the name information is consistent with the user name in the communication list, the user name in the communication list that is consistent with the name information is used as the user name successfully matching the name information. For example, the name information extracted from the input information is "Li Si", "Li Si" is compared with the user name in the communication list, it is found that a user name "Li Si" exists in the communication list, and the name information "Li Si" is consistent with the user name "Li Si" in the communication list. Therefore, the name information successfully matches the user name "Li Si" in the communication list.

1021, 1022, and 1031 are performed by the sender terminal or the server on the network side receiving the input information that is entered by the user. In the procedure of 1021, 1022, and 1031, operation intervention of the user is not needed, simplifying operations of the user.

In addition, when matching performed between the name information extracted from the input information and the user name in the communication list fails, the input information and the extracted name information may be directly bound, and sent to the receiver terminal in the group. The receiver terminal in the group displays the input information, and directly displays the name information around the input information to indicate that the input information is related to the name information, so that the user can relatively quickly learn to whom the input information is related.

By means of the message display method provided in this embodiment of the present invention, key information in input information can be extracted, the key information is matched with a user name in a communication list, the input information and the user name successfully matching the key information in the input information are bound, and the successfully matched user name and the input information that are bound are sent to a receiver terminal, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, a more specific name of a person is obtained by extracting name information from the key information in the input information, which can omit a process in which matching is performed between an unrelated word and a user name, and reduce a time taken in the matching process, thereby improving efficiency of the matching process.

Figure 3:
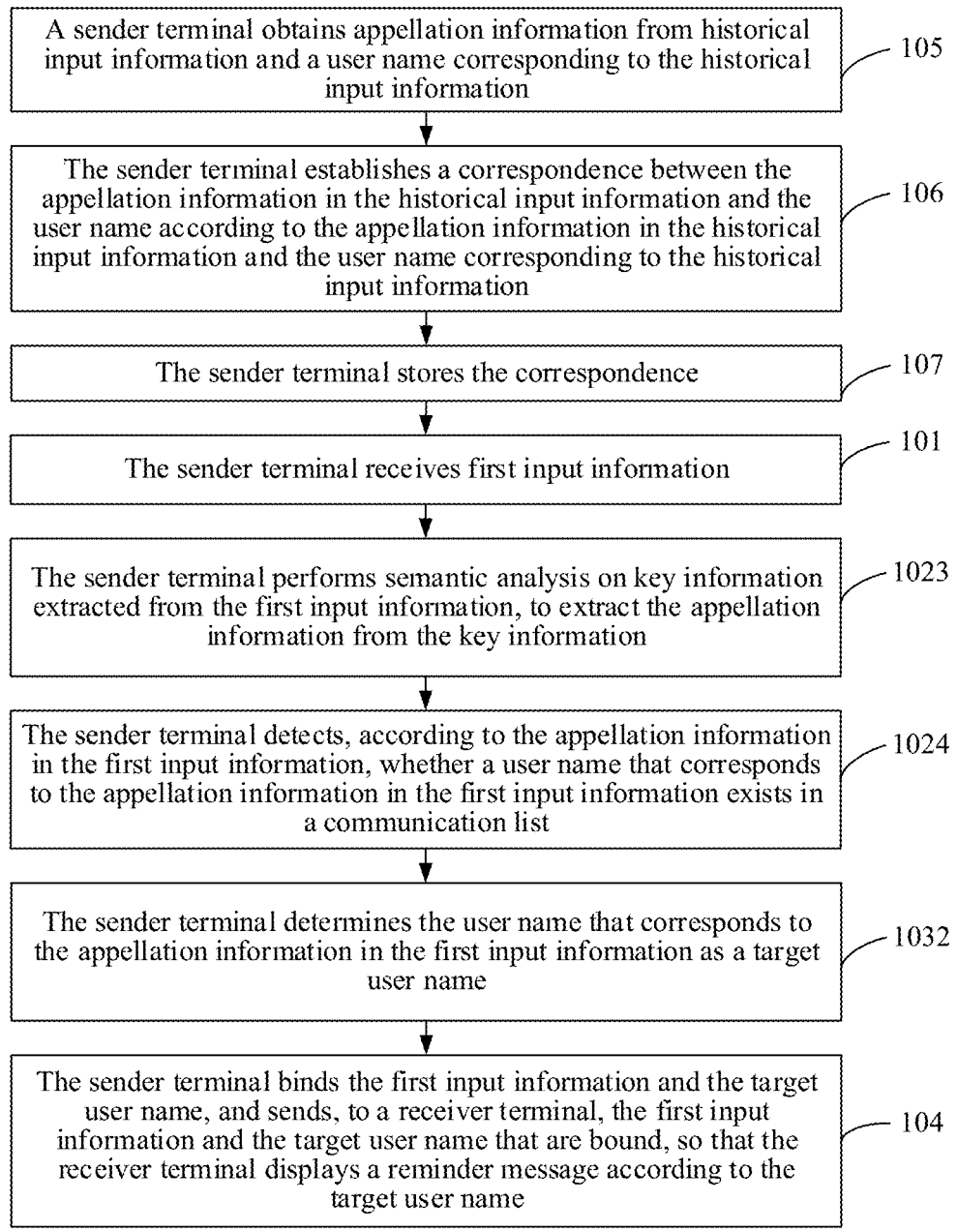
FIG. 3 is a flowchart of another implementation manner of a message display method according to an embodiment of the present invention.

Further, a correspondence between the appellation information and the user name may be further established, and the appellation information is usually an appellation and a nickname of a person, which therefore expands a successful matching range on the basis of ensuring accuracy of successful matching. Based on the solution shown in FIG. 1, an embodiment of the present invention further provides a specific solution of the message display method. 105 to 107 are added before 101, and the correspondence between the appellation information and the user name is established. When the correspondence between the appellation information and the user name is stored in the communication list, a process of performing 102 and 103 that are shown in FIG. 1 is further detailed. 102 may be specifically implemented as 1023 and 1024. 103 may be specifically implemented as 1032. As shown in FIG. 3, the specific solution includes:

105: The sender terminal obtains appellation information from historical input information and a user name corresponding to the historical input information.

The sender terminal or the server on the network side may obtain the historical input information, extract a name information in the historical input information, and obtain a user name corresponding to the historical input information. The historical input information may be non-group historical input information, that is, historical input information in one-to-one communication between terminals. Appellation information is extracted from the non-group historical input information in one-to-one communication between the terminals, and a user name of the receiver terminal in the input information is obtained, so that the correspondence between the appellation information and the user name is established in a subsequent process. The historical input information may also be historical input information in a group that is already bound to the user name, and the appellation information extracted from the historical input information in the group that is already bound to the user name, and the user name bound to the historical input information are obtained, so that the correspondence between the appellation information and the user name is established in a subsequent process.

It should be noted that the sender terminal or the server on the network side extracts, from the historical input information according to step 105, appellation information, such as a nickname or a brief appellation of a friend, commonly used by a user.

106: The sender terminal establishes a correspondence between the appellation information in the historical input information and the user name according to the appellation information in the historical input information and the user name corresponding to the historical input information.

The sender terminal or the server on the network side can establish the correspondence between the appellation information and the user name according to the obtained appellation information in the historical input information and the user name corresponding to the historical input information. The correspondence between the appellation information and the user name may be a correspondence between one piece of appellation information and one user name, or may be a correspondence between multiple pieces of appellation information and one user name. For example, appellation information "Xiao Si" corresponds to a user name "Li Si". For another example, all of appellation information "Xiao Si", "Teacher Li", and "Brother Li" corresponds to a user name "Li Si".

It should be noted that the appellation information and the user name corresponding to the appellation information may also be entered by the user in advance, so as to establish the correspondence between the name information and the user name. In a subsequent process, a correspondence pre-established by the user in an input manner may be used, to determine a target user name.

107: The sender terminal stores the correspondence.

The established correspondence between the appellation information and the user name is stored in the sender terminal or the server in the network side. Specifically, the correspondence between the appellation information and the user name may be stored in a communication list, or a dedicated database may be established to store the correspondence between the appellation information and the user name.

For example, input information including appellation information "Xiao Si" is often sent to "Li Si" in a QQ friend list on a mobile phone, and the terminal or the server on the network side records and stores the appellation information "Xiao Si" and a correspondence between the appellation information and the user name "Li Si" in the QQ friend list.

1023: The sender terminal performs semantic analysis on the key information extracted from the first input information, to extract the appellation information from the key information.

A process of performing semantic analysis and extracting the appellation information from the key information is basically the same as the process of extracting the name information from the key information in 1021, and is not described herein again.

1024: The sender terminal detects, according to the appellation information in the first input information, whether a user name that corresponds to the appellation information in the first input information exists in the communication list.

The correspondence between the appellation information in the historical input information and the user name is stored in the communication list, and the sender terminal or the server on the network side detects whether the user name that corresponds to the appellation information in the first input information exists in the communication list, to determine whether a user name successfully matching the appellation information exists.

1032: The sender terminal determines the user name that corresponds to the appellation information in the first input information as the target user name.

When the user name that corresponds to the appellation information in the first input information exists in the communication list, the appellation information is determined as the target user name. In a subsequent process, the target user name and the first input information are bound, and the first input information and the target user name that are bound are sent to the receiver terminal.

For example, four correspondences between appellation information and user names are stored in the communication list, and are respectively: a. a correspondence between appellation information "Engineer Zhang" and a user name "Zhang San"; b. a correspondence between appellation information "Xiao Si" and a user name "Li Si"; c. a correspondence between appellation information "Director Li" and a user name "Li Si"; d. a correspondence between appellation information "Brother Wang" and a user name "Wang Wu". Appellation information extracted from the first input information is "Engineer Zhang", and then the four correspondences a, b, c, and d stored in the communication list are searched. Because the user name "Zhang San" that corresponds to the appellation information "Engineer Zhang" exists, the user name "Zhang San" is used as the target user name. In a subsequent process, the target user name "Zhang San" and the first input information are bound, and the first input information and the target user name "Zhang San" that are bound are sent to the receiver terminal.

By means of the message display method provided in this embodiment of the present invention, key information in input information can be extracted, the key information is matched with a user name in a communication list, the input information and the user name successfully matching the key information in the input information are bound, and the successfully matched user name and the input information that are bound are sent to a receiver terminal, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, a correspondence between commonly used appellation information and the user name is established according to historical input information, so that appellation information that is different from the user name but directs to the user name successfully matches the user name, which expands a successful matching range on the basis of ensuring an accuracy rate of successful matching.

Figure 4:
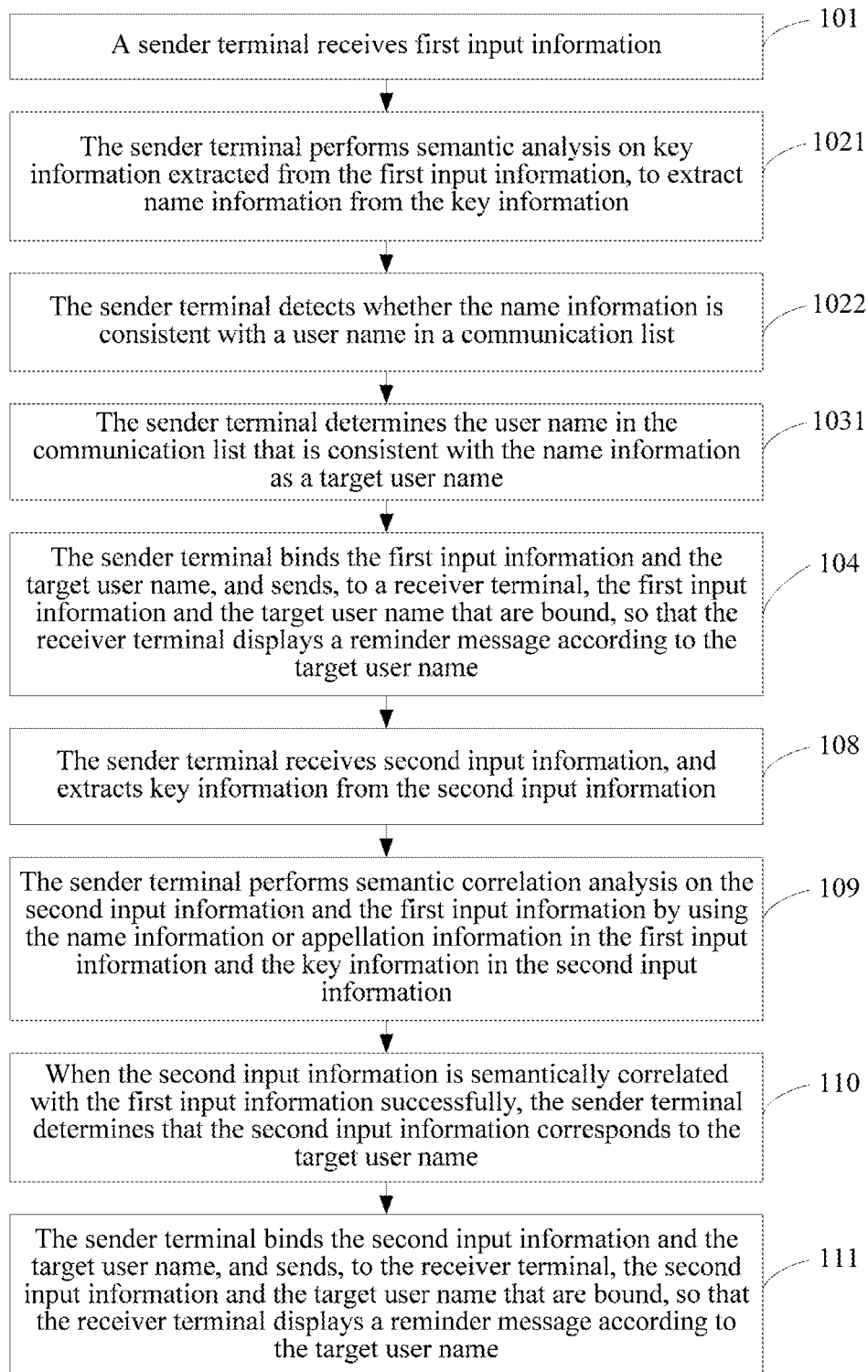
FIG. 4 is a flowchart of still another implementation manner of a message display method according to an embodiment of the present invention.

In addition, a correlation relationship often exists between continuous unread information. To more accurately obtain, according to a correlation relationship between input information, the user name successfully matching the input information, with reference to the solution shown in FIG. 2, based on the solution, an embodiment of the present invention further provides a message display method. 108 to 111 may be added after 104. As shown in FIG. 4, the message display method includes:

108: The sender terminal receives second input information, and extracts key information from the second input information.

The second input information is input information received after the first input information is received, and the second input information may be the first piece of input information received after the first input information is received, or may be N pieces of input information received after the first input information is received, where N is a positive integer.

The first input information may be text input information or voice input information, and the second input information may be text input information or voice input information. A relationship between forms of the first input information and the second input information includes, but is not limited to, the following cases: a. the first input information and the second input information are both text input information; b. the first input information and the second input information are both voice input information; c. the first input information is voice input information and the second input information is text input information; d. the first input information is text input information and the second input information is voice input information.

109: The sender terminal performs semantic correlation analysis on the second input information and the first input information by using the name information or the appellation information in the first input information and the key information in the second input information.

The sender terminal or the server on the network side performs semantic correlation analysis on the second input information and the first input information, that is, obtains key information, which is not the name information or the appellation information, in the second input information, and performs semantic correlation analysis on the key information, which is not the name information or the appellation information, in the second input information, and the name information or the appellation information in the first input information. Specifically, the sender terminal or the server on the network side performs semantic analysis on the key information in the second input information and the name information or the appellation information in the first input information, and determines whether the key information in the second input information is directional to the first input information, that is, whether both the key information in the second input information and the name information or the appellation information in the first input information are two different appellations of a same object. Therefore, whether the second input information is correlated with the first input information is determined, that is, whether the second input information is successfully correlated with the first input information is determined. It should be noted that the key information, which is not the name information or the appellation information, in the second input information refers to a word that is not a noun, a name of a person, or a nickname or a brief appellation of a person in the key information, and the key information that is not the name information or the appellation information may be a word, such as a pronoun, that has a function of directing to name information, appellation information, or a user name. That the second input information is successfully correlated with the first input information indicates that the user name that can be bound to the second input information is the same as the target user name bound to the first input information. For example, the first input information is "Xiao Si, how are you?", and the second input information is "What do you do now?". Semantic correlation analysis is performed on the first input information and the second input information, and it may be obtained that "you" in the second input information corresponds to "Xiao Si" in the first input information. Therefore, it may be obtained that the second input information is correlated with the appellation information extracted from the key information in the first input information, that is, the second input information is semantically correlated with the first input information successfully.

110: When the second input information is semantically correlated with the first input information successfully, the sender terminal determines that the second input information corresponds to the target user name.

When the second input information is semantically correlated with the first input information successfully, that is, the key information in the second input information is directional to the first input information, that is, both the key information in the second input information and the appellation information in the first input information are two different appellations of a same object, the terminal or the server on the network side determines the target user name corresponding to the second input information. For example, in the example in 109, because the second input information is semantically correlated with the first input information successfully, it is determined that the target user name corresponding to the second input information is the same as the target user name corresponding to the first input information. The target user name of the first input information is "Li Si"; therefore, the target user name corresponding to the second input information is also "Li Si", that is, the second input information corresponds to the target user name "Li Si" of the first input information.

111: The sender terminal binds the second input information and the target user name, and sends, to the receiver terminal, the second input information and the target user name that are bound, so that the receiver terminal displays a reminder message according to the target user name.

A process of binding the second input information and the user name in the communication list is the same as the process of binding the first input information and the user name in the communication list in 104, and is not described herein again.

By means of the message display method provided in this embodiment of the present invention, key information in input information can be extracted, the key information is matched with a user name in a communication list, the input information and the user name successfully matching the key information in the input information are bound, and the successfully matched user name and the input information that are bound are sent to a receiver terminal, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, semantic correlation analysis is performed on second input information and first input information. In this way, in a case in which name information and appellation information do not directly exist in the second input information, a target user name that can be bound to the second input information can be determined according to a successful correlation between the second input information and the first input information, so that the user name that should be bound to the input information is obtained more accurately and more comprehensively.

Figure 5:
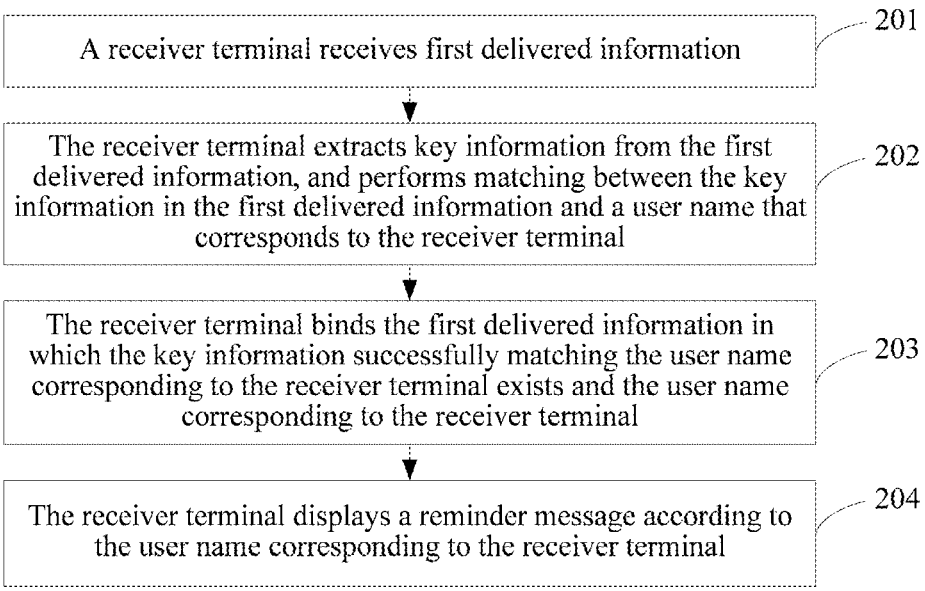
FIG. 5 is a flowchart of another message display method according to an embodiment of the present invention.

An embodiment of the present invention provides a message display method, applied to a receiver terminal. Delivered information received by the receiver terminal is sent by a server on a network side. As shown in FIG. 5, the message display method includes:

201: The receiver terminal receives first delivered information.

The first delivered information is sent by a server, that is, the first delivered information is sent by the server on the network side. The receiver terminal receives the first delivered information, and the first delivered information may be voice delivered information, or may be text delivered information.

202: The receiver terminal extracts key information from the first delivered information, and matches the key information in the first delivered information and a user name that corresponds to the receiver terminal.

When the receiver terminal receives the delivered information sent by the server on the network side, the receiver terminal extracts the key information in the delivered information. Specifically, word segmentation is performed on the received delivered information, to obtain a keyword, that is, the key information, generated after the delivered information is segmented. The key information is matched with the user name that corresponds to the receiver terminal, that is, whether the delivered information is related to a user name in a communication list is detected. For example, the first delivered information is "Teacher Li, where are you now?", and word segmentation is then performed on the first delivered information, to obtain key information that is words, such as "Teacher Li" and "where". The user name corresponding to the receiver terminal is a user name of the receiver terminal in a communication list in an instant messaging application. For example, when a local mobile phone uses QQ, a user name of the local mobile phone is "Li Si", and therefore, a user name corresponding to the local mobile phone is "Li Si".

It should be noted that the key information is one type of word or a set of multiple types of words, such as a verb, a noun, a pronoun, and an adjective.

203: The receiver terminal binds the user name that corresponds to the receiver terminal and the first delivered information that successfully match each other.

The delivered information in which the key information successfully matching the user name corresponding to the receiver terminal exists is bound to the user name corresponding to the receiver terminal, and reminder information is directly displayed on the receiver terminal to indicate that the delivered information is related to the user name corresponding to the receiver terminal. It should be noted that, the first delivered information and the target user name are bound, so that the target user name is attached to the first delivered information, and when the first delivered information is transferred, the target user name is transferred along with the first delivered information.

204: The receiver terminal displays a reminder message according to the user name corresponding to the receiver terminal.

The reminder message includes the user name corresponding to the receiver terminal or identification information corresponding to the user name corresponding to the receiver terminal. It should be noted that the reminder message is displayed only on the receiver terminal related to the delivered information, and the reminder message includes the user name corresponding to the receiver terminal or the identification information corresponding to the user name corresponding to the receiver terminal. For example, as shown in FIG. 1*a*, on a chat interface of a working group on the receiver terminal, a reminder message having words of "related to me" is displayed while the user name corresponding to the receiver terminal is displayed. For a specific representation form of the reminder message, refer to the description in step 104. Details are not described herein again. The receiver terminal may further display an amount reminder message used to remind a user of an amount of delivered information related to "me". The receiver terminal can further receive a trigger operation of the user on the amount reminder message, and lock a display interface to a location of the delivered information related to "me".

By means of the message display method further provided in this embodiment of the present invention, key information in delivered information can be extracted, the key information is matched with a user name that corresponds to a receiver terminal, the delivered information successfully matching the user name corresponding to the receiver terminal is bound to the user name corresponding to the receiver terminal, and the receiver terminal displays a reminder message. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user.

Figure 6:
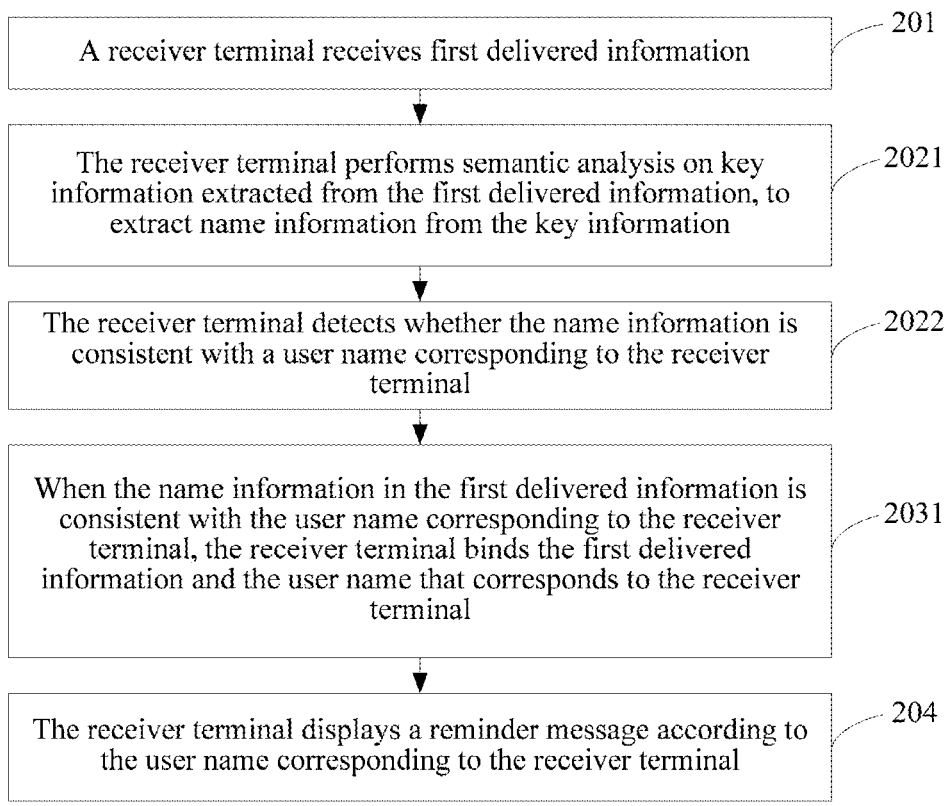
FIG. 6 is a flowchart of an implementation manner of another message display method according to an embodiment of the present invention.

Further, the key information includes name information or appellation information. The name information is usually a name of a person, and the appellation information is usually an appellation or a nickname of a person. In this embodiment, matching is mainly performed between the name information and the user name in the communication list, and a successfully matched user name is obtained. Based on the solution shown in FIG. 5, an embodiment of the present invention further provides a specific solution of the message display method, to further detail a process of performing 202 and 203 that are shown in FIG. 5. 202 may be specifically implemented as 2021 and 2022, and 203 may be specifically implemented as 2031. As shown in FIG. 6, the specific solution includes:

2021: The receiver terminal performs semantic analysis on the key information extracted from the first delivered information, to extract name information from the key information.

The key information extracted from the delivered information is extracted in a form of a keyword. Therefore, the key information may be one type of word or a set of multiple types of words, such as a noun, a verb, a pronoun, and an adjective, and the name information is usually a name of a person. The receiver terminal performs semantic analysis on the first delivered information. Specifically, the receiver terminal may obtain the name information from the obtained key information, that is, the keyword, according to grammar. For example, the first delivered information is "Zhang San, come here". Then, key information that is words such as "Zhang San" and "you" is extracted. After semantic analysis, name information that may be extracted from the key information is "Zhang San".

2022: The receiver terminal detects whether the name information is consistent with the user name corresponding to the receiver terminal.

After the name information is obtained, the name information is compared with the user name corresponding to the receiver terminal, and whether the name information is consistent with the user name corresponding to the receiver terminal is detected.

2031: When the name information in the first delivered information is consistent with the user name corresponding to the receiver terminal, the receiver terminal binds the first delivered information and the user name that corresponds to the receiver terminal.

When the name information is consistent with the user name corresponding to the receiver terminal, the first delivered information in which the name information consistent with the user name corresponding to the receiver terminal exists is bound to the user name corresponding to the receiver terminal, and a reminder message is displayed on the receiver terminal. For example, name information extracted from the delivered information is "Zhang San", and "Zhang San" is compared with the user name corresponding to the receiver terminal; when the name information "Zhang San" is consistent with the user name corresponding to the receiver terminal, the delivered information in which the name information exists is bound to the user name "Zhang San" corresponding to the receiver terminal; a reminder message having words of "related to me" or "related to Zhang San" is displayed on the receiver terminal.

2021, 2022, and 2031 are performed by the corresponding receiver terminal receiving the delivered information sent by the server. In the procedure of 2021, 2022, and 2031, operation intervention of the user is not needed, simplifying operations of the user.

By means of the message display method further provided in this embodiment of the present invention, key information in delivered information can be extracted, the key information is matched with a user name that corresponds to a receiver terminal, the delivered information successfully matching the user name corresponding to the receiver terminal is bound to the user name corresponding to the receiver terminal, and the receiver terminal displays a reminder message. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, a more specific name or appellation of a person is obtained by extracting name information from the key information in the delivered information, which can omit a process in which matching is performed between an unrelated word and the user name corresponding to the receiver terminal, and reduce a time taken in the matching process, thereby improving efficiency of the matching process.

Figure 7:
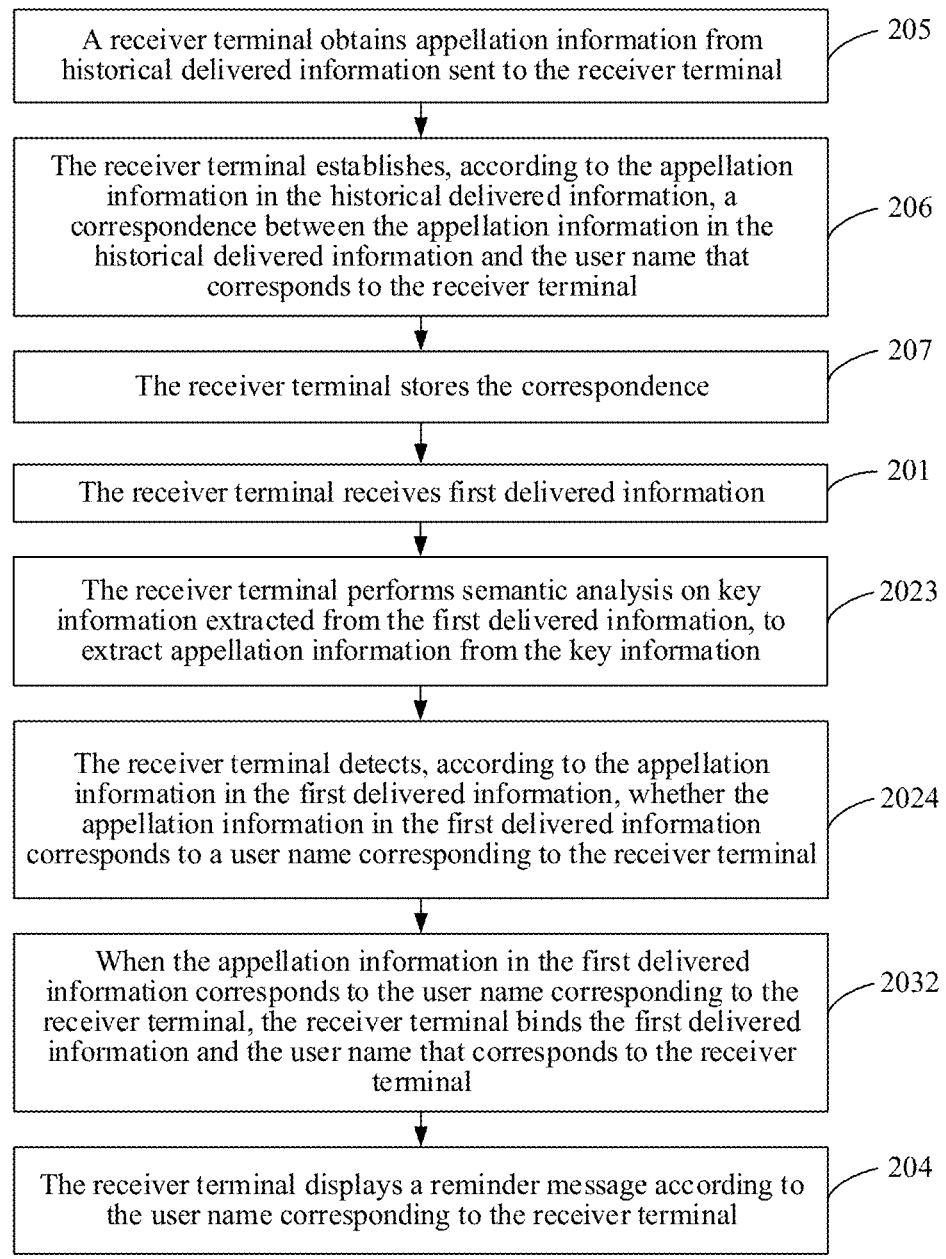
FIG. 7 is a flowchart of another implementation manner of another message display method according to an embodiment of the present invention.

Further, a correspondence between the appellation information and the user name that corresponds to the receiver terminal may be further established, which therefore expands a successful matching range on the basis of ensuring accuracy of successful matching. Based on the solution shown in FIG. 5, an embodiment of the present invention further provides a specific solution of the message display method. 205 to 207 are added before 201. The correspondence between the appellation information and the user name that corresponds to the receiver terminal is established, and a process of performing 202 and 203 that are shown in FIG. 5 is further detailed. 202 may be specifically implemented as 2023 and 2024. 203 may be specifically implemented as 2032. As shown in FIG. 7, the specific solution includes:

205: The receiver terminal obtains appellation information from historical delivered information sent to the receiver terminal.

The appellation information is usually an appellation, a nickname, a brief appellation, or the like of a person. When non-group one-to-one communication is performed between another terminal and the receiver terminal, the receiver terminal may obtain the appellation information in the historical delivered information sent to the receiver terminal, so that a correspondence between the appellation information and the user name that corresponds to the receiver terminal is established in a subsequent process; and/or the receiver terminal obtains historical delivered information, which is bound to the user name corresponding to the receiver terminal, in a group, and obtains the appellation information in the historical delivered information, so that the correspondence between the appellation information and the user name that corresponds to the receiver terminal is established in a subsequent process.

206: The receiver terminal establishes, according to the appellation information in the historical delivered information, a correspondence between the appellation information in the historical delivered information and the user name that corresponds to the receiver terminal.

The receiver terminal can establish, according to the appellation information in the historical delivered information sent to the receiver terminal and the user name corresponding to the receiver terminal, the correspondence between the appellation information and the user name that corresponds to the receiver terminal. The correspondence between the appellation information and the user name that corresponds to the receiver terminal may be a correspondence between one piece of appellation information and the user name that corresponds to the receiver terminal, or may be a correspondence between multiple pieces of appellation information and the user name that corresponds to the receiver terminal. For example, a user name corresponding to the receiver terminal is "Zhang San", and appellation information "Engineer Zhang" corresponds to the user name "Zhang San" that corresponds to the receiver terminal. For another example, both appellation information "Engineer Zhang" and "Brother Zhang" correspond to the user name "Zhang San" corresponding to the receiver terminal.

It should be noted that the appellation information corresponding to the user name of the receiver terminal may also be entered by the user in advance, so as to establish the correspondence between a name information and the user name corresponding to the receiver terminal. In a subsequent process, a correspondence pre-established by the user in an input manner may be used, to determine whether the delivered information and the user name that corresponds to the receiver terminal are bound.

207: The receiver terminal stores the correspondence.

The established correspondence between the appellation information and a user name that corresponds to a local user is stored in the receiver terminal. Specifically, the correspondence between the appellation information and the user name that corresponds to the local user may be stored in the communication list, or a dedicated database may be established to store the correspondence between the appellation information and the user name that corresponds to the receiver terminal.

2023: The receiver terminal performs semantic analysis on the key information extracted from the first delivered information, to extract the appellation information from the key information.

For specific content of performing semantic analysis and extracting the appellation information from the key information in the delivered information, refer to the content of extracting the name information from the key information in the input information in step 1021. Details are not described herein again.

2024: The receiver terminal detects, according to the appellation information in the first delivered information, whether the appellation information in the first delivered information corresponds to the user name corresponding to the receiver terminal.

The receiver terminal detects whether the appellation information in the first delivered information corresponds to the user name, which corresponds to the receiver terminal, in the communication list, to determine whether the first delivered information and the user name that corresponds to the receiver terminal are bound.

2032: When the appellation information in the first delivered information corresponds to the user name corresponding to the receiver terminal, the receiver terminal binds the first delivered information and the user name that corresponds to the receiver terminal.

When the appellation information in the first delivered information corresponds to the user name corresponding to the receiver terminal, the first delivered information and the user name that corresponds to the receiver terminal are bound, and the receiver terminal displays reminder information on the receiver terminal.

By means of the message display method further provided in this embodiment of the present invention, key information in delivered information can be extracted, the key information is matched with a user name that corresponds to a receiver terminal, the delivered information successfully matching the user name corresponding to the receiver terminal is bound to the user name corresponding to the receiver terminal, and the receiver terminal displays a reminder message. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, a correspondence between commonly used appellation information and the user name that corresponds to the receiver terminal is established according to historical delivered information, so that appellation information that is different from the user name corresponding to the receiver terminal but directs to the user name successfully matches the user name corresponding to the receiver terminal, which expands a successful matching range on the basis of ensuring an accuracy rate of successful matching.

Figure 8:
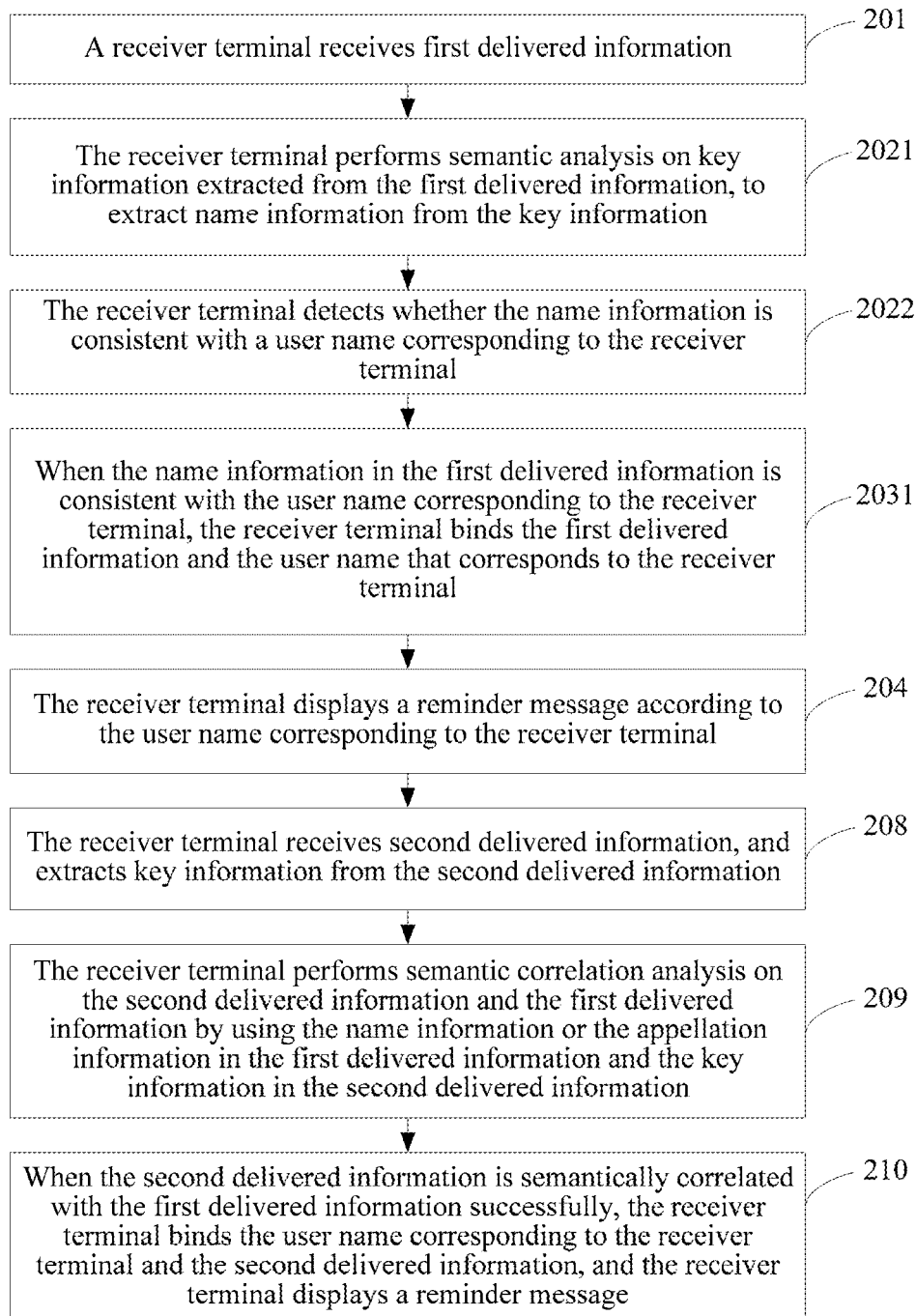
FIG. 8 is a flowchart of still another implementation manner of another message display method according to an embodiment of the present invention.

In addition, a correlation relationship often exists between continuous unread information. To more accurately obtain, according to a correlation relationship between delivery information, the user name that can be bound to the delivered information, with reference to the solution shown in FIG. 6, based on the solution, an embodiment of the present invention further provides a message display method. 208 to 210 may be added after 2031. As shown in FIG. 8, the message display method includes:

208: The receiver terminal receives second delivered information, and extracts key information from the second delivered information.

The second delivered information is delivered information received after the first delivered information is received, and the second delivered information may be the first piece of delivered information received after the first delivered information is received, or may be N pieces of delivered information received after the first delivered information is received, where N is a positive integer.

The first delivered information may be text delivered information or voice delivered information, and the second delivered information may be text delivered information or voice delivered information. A relationship between forms of the first delivered information and the second delivered information includes, but is not limited to, the following cases: a. the first delivered information and the second delivered information are both text delivered information; b. the first delivered information and the second delivered information are both voice delivered information; c. the first delivered information is voice delivered information and the second delivered information is text delivered information; d. the first delivered information is text delivered information and the second delivered information is voice delivered information.

209: The receiver terminal performs semantic correlation analysis on the second delivered information and the first delivered information by using the name information or the appellation information in the first delivered information and the key information in the second delivered information.

The receiver terminal performs semantic correlation analysis on the second delivered information and the first delivered information, that is, obtains key information, which is not the name information or the appellation information, in the second delivered information, and performs semantic correlation analysis on the key information, which is not the name information or the appellation information, in the second delivered information and the name information or the appellation information in the first delivered information. Specifically, the sender terminal or the server on the network side performs semantic analysis on the key information in the second input information and the name information or the appellation information in the first input information, and determines whether the key information in the second input information is directional to the first input information, that is, whether both the key information in the second input information and the name information or the appellation information in the first input information are two different appellations of a same object. Therefore, whether the second delivered information is correlated with the name information or the appellation information extracted from the key information in the first delivered information is determined, that is, whether the second delivered information is successfully correlated with the first delivered information is determined. It should be noted that the key information, which is not the name information or the appellation information, in the second delivered information refers to a word that is not a noun, a name of a person, or a nickname or a brief appellation of a person in the key information, and the key information that is not the name information or the appellation information may be a word, such as a pronoun, that has a function of directing to name information, appellation information, or a user name. That the second delivered information is successfully correlated with the first delivered information indicates that the second delivered information is also bound to the user name corresponding to the receiver terminal. For example, the first delivered information is "Zhang San, a meeting starts at 4 p.m!", and the second delivered information is "Take a notebook computer when you come to a conference room!". Semantic correlation analysis is performed on the first delivered information and the second delivered information, and it may be obtained that "you" in the second delivered information corresponds to "Zhang San" in the first delivered information. Therefore, it may be obtained that the second delivered information is correlated with the name information extracted from the key information in the first delivered information, that is, the second delivered information is semantically correlated with the first delivered information successfully.

210: When the second delivered information is semantically correlated with the first delivered information successfully, the receiver terminal binds the user name corresponding to the receiver terminal and the second delivered information, and displays a reminder message.

When the second delivered information is semantically correlated with the first delivered information successfully, that is, the key information in the second input information is directional to the first input information, that is, both the key information in the second input information and the appellation information in the first input information are two different appellations of a same object, the receiver terminal binds the second delivered information and the user name that corresponds to the receiver terminal, and the receiver terminal displays the reminder message. For example, in the example in 209, because the second delivered information is successfully correlated with the first delivered information, the second delivered information and the user name that corresponds to the receiver terminal are bound.

By means of the message display method further provided in this embodiment of the present invention, key information in delivered information can be extracted, the key information is matched with a user name that corresponds to a receiver terminal, the delivered information successfully matching the user name corresponding to the receiver terminal is bound to the user name corresponding to the receiver terminal, and the receiver terminal displays a reminder message. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, semantic correlation analysis is performed on second delivered information and first delivered information. In this way, in a case in which name information and appellation information do not directly exist in the second delivered information, the second delivered information and the user name that corresponds to the receiver terminal are bound according to a successful correlation between the second delivered information and the first delivered information, so that the delivered information bound to the user name corresponding to the receiver terminal is obtained more accurately and more comprehensively.

Figure 9:
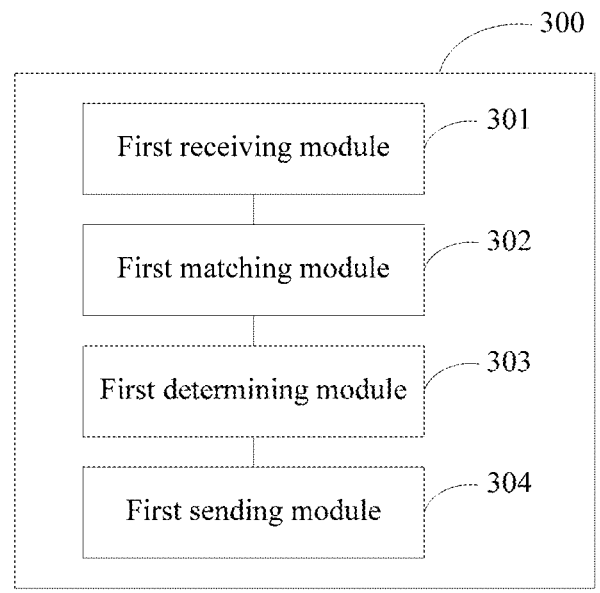
FIG. 9 is a schematic structural diagram of a message display apparatus according to an embodiment of the present invention.

An embodiment of the present invention further provides a message display apparatus 300. As shown in FIG. 9, the message display apparatus 300 includes:

a first receiving module 301, configured to receive first input information;

a first matching module 302, configured to: extract key information from the first input information, and match between the key information in the first input information and a user name in a communication list;

a first determining module 303, configured to determine a target user name, where the target user name is a user name that successfully matches the key information in the first input information; and a first sending module 304, configured to: bind the first input information and the target user name, and send, to a receiver terminal, the first input information and the target user name that are bound, so that the receiver terminal displays a reminder message according to the target user name, where the reminder message includes the target user name or identification information corresponding to the target user name.

The message display apparatus provided in this embodiment of the present invention can extract key information from input information, match between the key information and a user name in a communication list, bind the input information and the user name successfully matching the key information in the input information, and send, to a receiver terminal, the successfully matched user name and the input information that are bound, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user.

Figure 10:
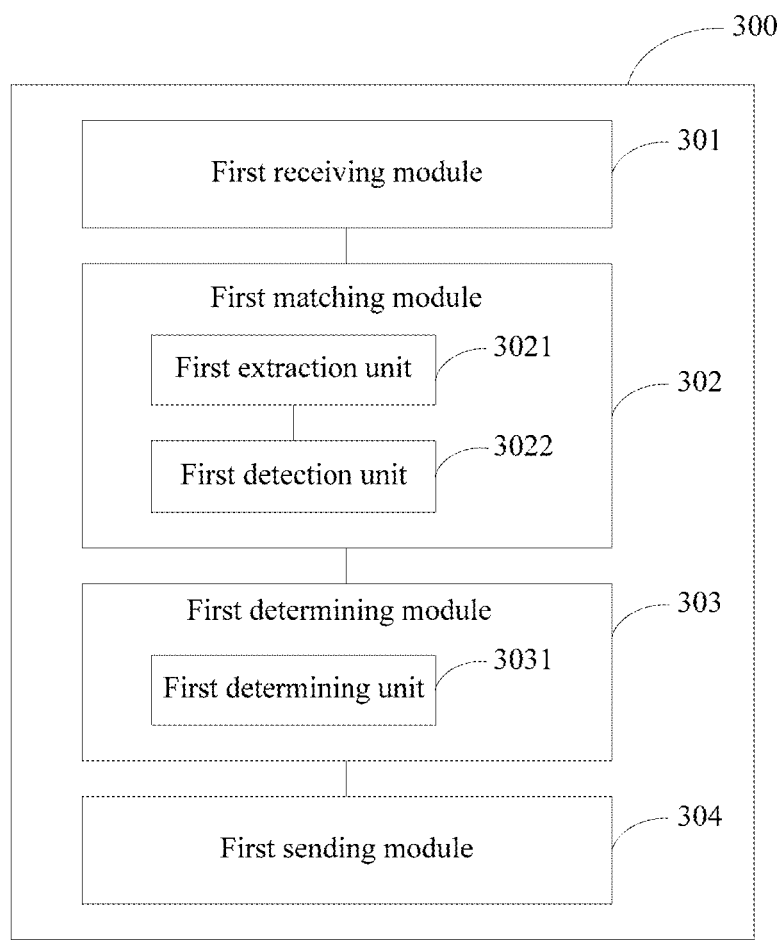
FIG. 10 is a schematic structural diagram of an implementation manner of a message display apparatus according to an embodiment of the present invention.

Further, the key information includes name information or appellation information. As shown in FIG. 10, the first matching module 302 includes:

a first extraction unit 3021, configured to: perform semantic analysis on the key information extracted from the first input information, to extract the name information from the key information; and a first detection unit 3022, configured to detect whether the name information is consistent with the user name in the communication list.

The first determining module 303 includes:

a first determining unit 3031, configured to determine the user name in the communication list that is consistent with the name information as the target user name.

The message display apparatus provided in this embodiment of the present invention can extract key information from input information, match between the key information and a user name in a communication list, bind the input information and the user name successfully matching the key information in the input information, and send, to a receiver terminal, the successfully matched user name and the input information that are bound, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, a more specific name of a person is obtained by extracting name information from the key information in the input information, which can omit a process in which matching is performed between an unrelated word and the user name, and reduce a time taken in the matching process, thereby improving efficiency of the matching process.

Figure 11:
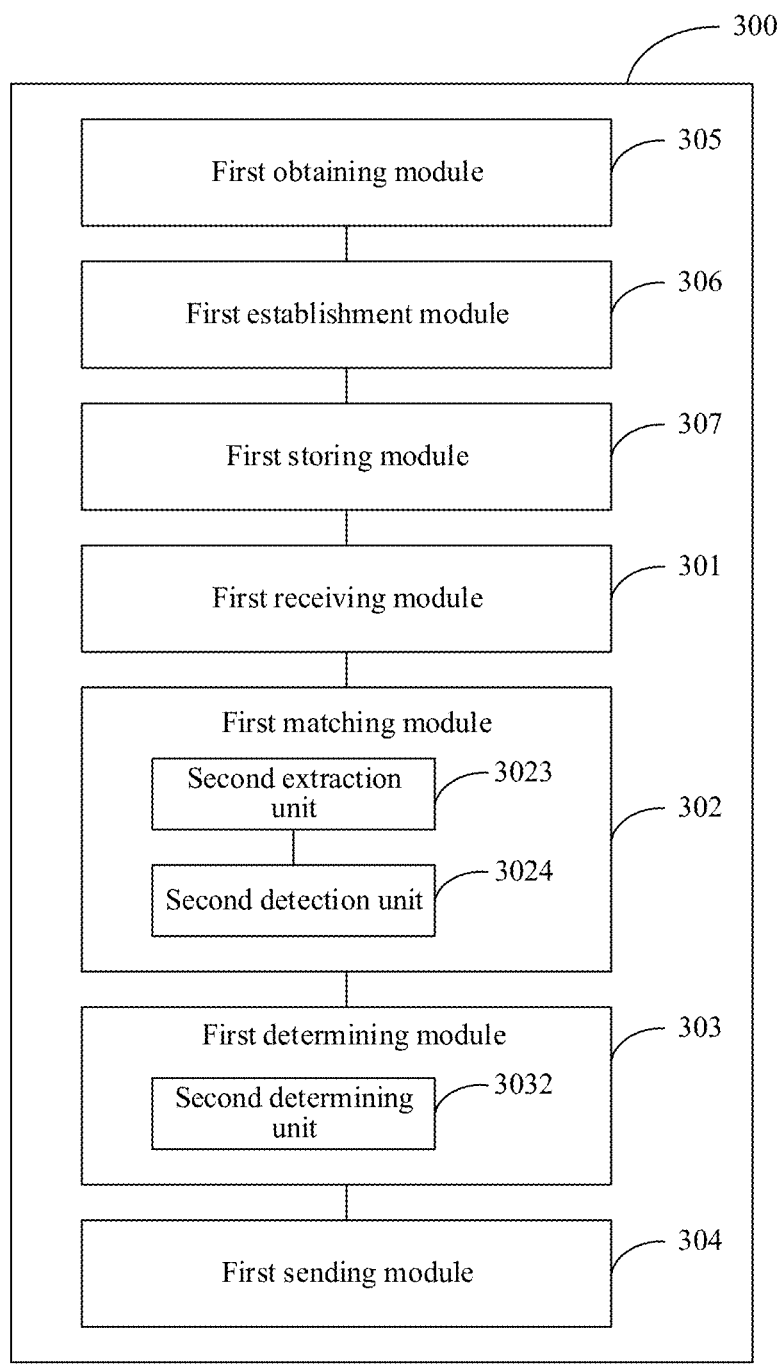
FIG. 11 is a schematic structural diagram of another implementation manner of a message display apparatus according to an embodiment of the present invention.

In addition, a correspondence between the appellation information and the user name is saved in the communication list. As shown FIG. 11, the apparatus 300 further includes:

a first obtaining module 305, configured to obtain appellation information in historical input information and a user name corresponding to the historical input information; and a first establishment module 306, configured to establish a correspondence between the appellation information in the historical input information and the user name according to the appellation information in the historical input information and the user name corresponding to the historical input information; and a first storing module 307, configured to store the correspondence.

The first matching module 302 includes:

a second extraction unit 3023, configured to: perform semantic analysis on the key information extracted from the first input information, to extract the appellation information from the key information; and a second detection unit 3024, configured to detect, according to the appellation information in the first input information, whether a user name that corresponds to the appellation information in the first input information exists in the communication list.

The first determining module 303 includes:

a second determining unit 3032, configured to determine the user name that corresponds to the appellation information in the first input information as the target user name.

The message display apparatus provided in this embodiment of the present invention can extract key information from input information, match between the key information and a user name in a communication list, bind the input information and the user name successfully matching the key information in the input information, and send, to a receiver terminal, the successfully matched user name and the input information that are bound, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, a correspondence between commonly used appellation information and the user name is established according to historical input information, so that appellation information that is different from the user name but directs to the user name successfully matches the user name, which expands a successful matching range on the basis of ensuring an accuracy rate of successful matching.

Figure 12:
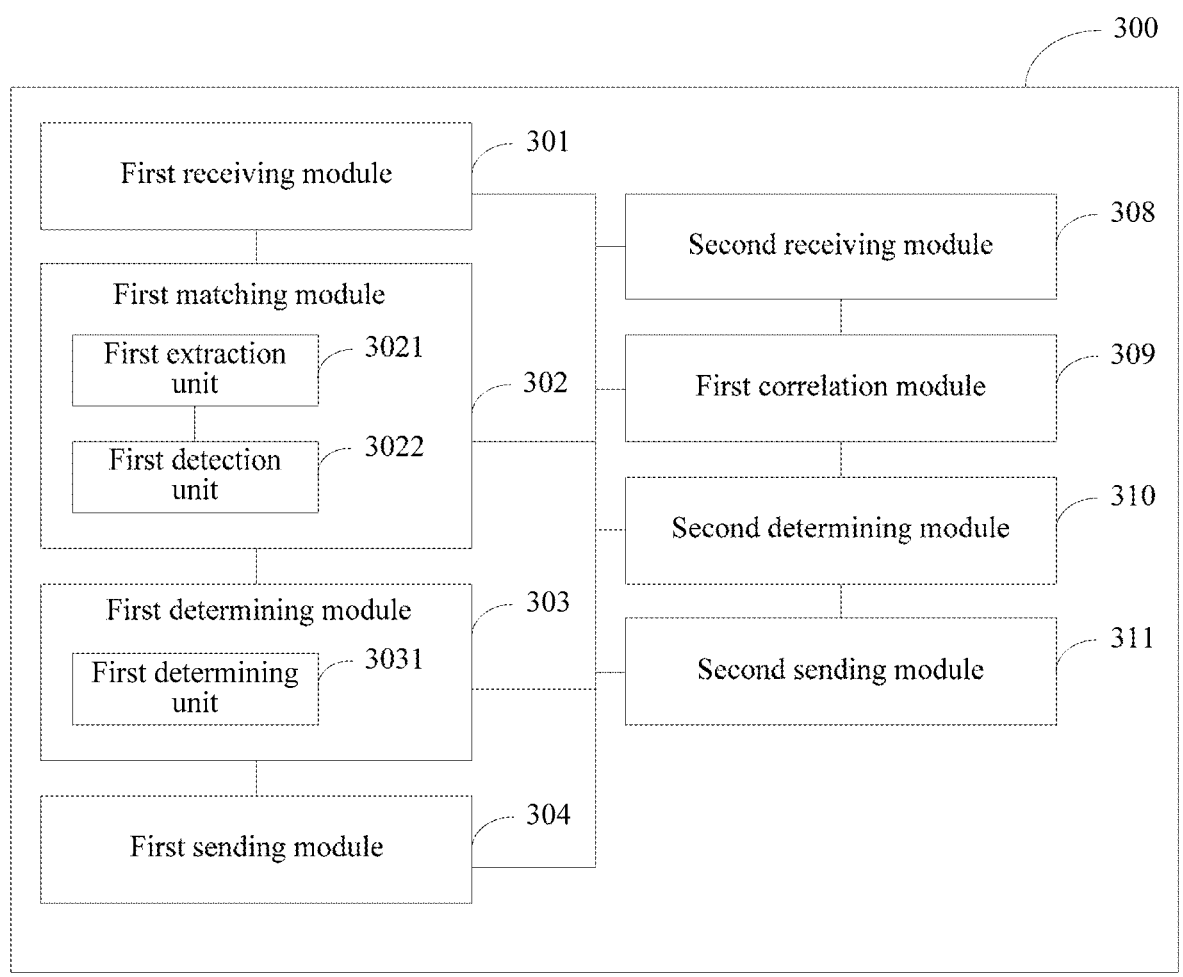
FIG. 12 is a schematic structural diagram of still another implementation manner of a message display apparatus according to an embodiment of the present invention.

In addition, as shown in FIG. 12, the apparatus 300 further includes:

a second receiving module 308, configured to receive second input information, where the second input information is input information received after the first input information is received;

a first correlation module 309, configured to perform semantic correlation analysis on the second input information and the first input information by using the name information or the appellation information in the first input information and key information in the second input information;

a second determining module 310, configured to: when the second input information is semantically correlated with the first input information successfully, determine that the key information in the second input information successfully matches the target user name; and a second sending module 311, configured to: bind the second input information and the target user name, and send, to the receiver terminal, the second input information and the target user name that are bound, so that the receiver terminal displays a reminder message according to the target user name.

It should be noted that the first input information includes text input information or voice input information, and the second input information includes text input information or voice input information.

The message display apparatus provided in this embodiment of the present invention can extract key information from input information, match between the key information and a user name in a communication list, bind the input information and the user name successfully matching the key information in the input information, and send, to a receiver terminal, the successfully matched user name and the input information that are bound, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, semantic correlation analysis is performed on second input information and first input information. In this way, in a case in which name information and appellation information do not directly exist in the second input information, a target user name that can be bound to the second input information can be determined according to a successful correlation between the second input information and the first input information, so that the user name that should be bound to the input information is obtained more accurately and more comprehensively.

Figure 13:
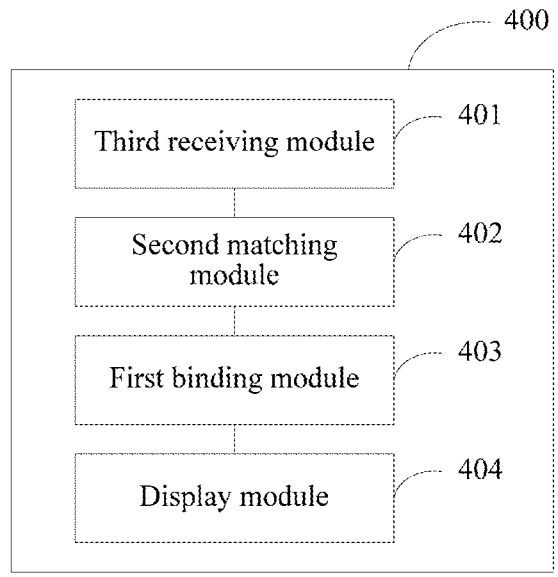
FIG. 13 is a schematic structural diagram of another message display apparatus according to an embodiment of the present invention.

An embodiment of the present invention further provides a message display apparatus 400. As shown in FIG. 13, the message display apparatus 400 includes:

a third receiving module 401, configured to receive first delivered information;

a second matching module 402, configured to: extract key information from the first delivered information, and match between the key information in the first delivered information and a user name that corresponds to a receiver terminal;

a first binding module 403, configured to bind the first delivered information in which the key information successfully matching the user name corresponding to the receiver terminal exists and the user name corresponding to the receiver terminal; and a display module 404, configured to display a reminder message according to the user name corresponding to the receiver terminal, where the reminder message includes the user name corresponding to the receiver terminal or identification information corresponding to the user name corresponding to the receiver terminal.

The message display apparatus provided in this embodiment of the present invention can extract key information from delivered information, match between the key information and a user name that corresponds to a receiver terminal, bind the delivered information successfully matching the user name corresponding to the receiver terminal and the user name corresponding to the receiver terminal, and display a reminder message on the receiver terminal. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user.

Figure 14:
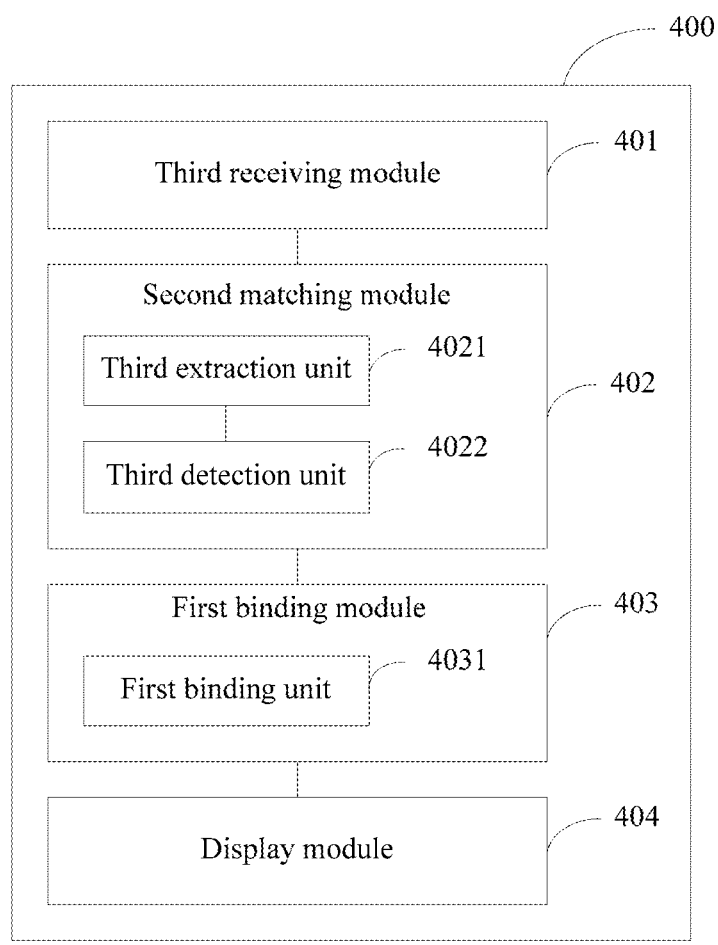
FIG. 14 is a schematic structural diagram of an implementation manner of another message display apparatus according to an embodiment of the present invention.

Further, the key information includes name information or appellation information. As shown in FIG. 14, the second matching module 402 includes:

a third extraction unit 4021, configured to: perform semantic analysis on the key information extracted from the first delivered information, to extract the name information from the key information; and a third detection unit 4022, configured to detect whether the name information is consistent with the user name corresponding to the receiver terminal.

The first binding module 403 includes:

a first binding unit 4031, configured to: when the name information in the first delivered information is consistent with the user name corresponding to the receiver terminal, bind the first delivered information and the user name that corresponds to the receiver terminal.

The message display apparatus further provided in this embodiment of the present invention can extract key information from delivered information, match between the key information and a user name that corresponds to a receiver terminal, bind the delivered information successfully matching the user name corresponding to the receiver terminal and the user name corresponding to the receiver terminal, and display a reminder message on the receiver terminal. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, a more specific name or appellation of a person is obtained by extracting name information from the key information in the delivered information, which can omit a process in which matching is performed between an unrelated word and the user name corresponding to the receiver terminal, and reduce a time taken in the matching process, thereby improving efficiency of the matching process.

Figure 15:
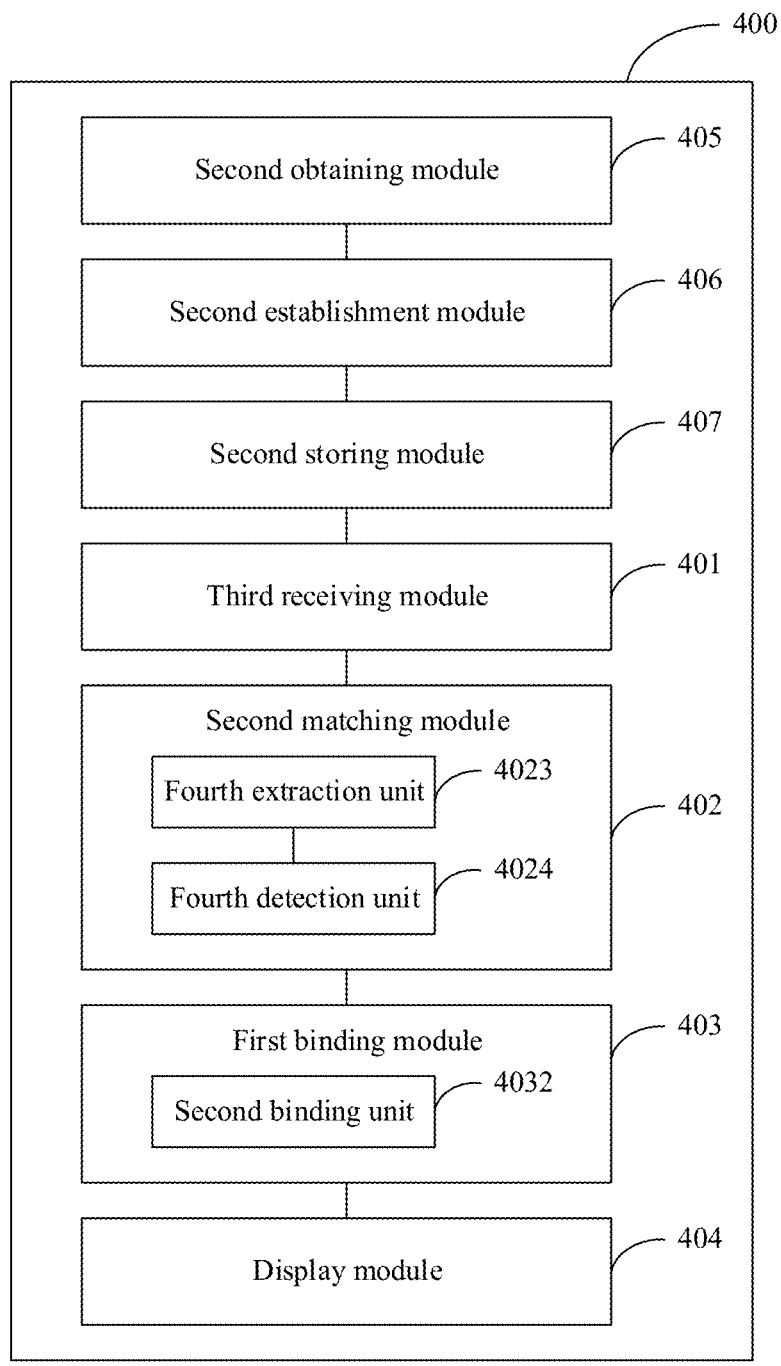
FIG. 15 is a schematic structural diagram of another implementation manner of another message display apparatus according to an embodiment of the present invention.

In addition, as shown in FIG. 15, the apparatus 400 further includes:

a second obtaining module 405, configured to obtain appellation information in historical delivered information sent to the receiver terminal;

a second establishment module 406, configured to establish, according to the appellation information in the historical delivered information, a correspondence between the appellation information in the historical delivered information and the user name that corresponds to the receiver terminal; and a second storing module 407, configured to store the correspondence.

The second matching module 402 includes:

a fourth extraction unit 4023, configured to: perform semantic analysis on the key information extracted from the first delivered information, to extract the appellation information from the key information; and a fourth detection unit 4024, configured to detect, according to the appellation information in the first delivered information, whether the appellation information in the first delivered information corresponds to the user name corresponding to the receiver terminal.

The first binding module 403 includes:

a second binding unit 4032, configured to: when the appellation information in the first delivered information corresponds to the user name corresponding to the receiver terminal, bind the first delivered information and the user name that corresponds to the receiver terminal.

The message display apparatus further provided in this embodiment of the present invention can extract key information from delivered information, match between the key information and a user name that corresponds to a receiver terminal, bind the delivered information successfully matching the user name corresponding to the receiver terminal and the user name corresponding to the receiver terminal, and display a reminder message on the receiver terminal. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, a correspondence between commonly used appellation information and the user name that corresponds to the receiver terminal is established according to historical delivered information, so that appellation information that is different from the user name corresponding to the receiver terminal but directs to the user name successfully matches the user name corresponding to the receiver terminal, which expands a successful matching range on the basis of ensuring an accuracy rate of successful matching.

Figure 16:
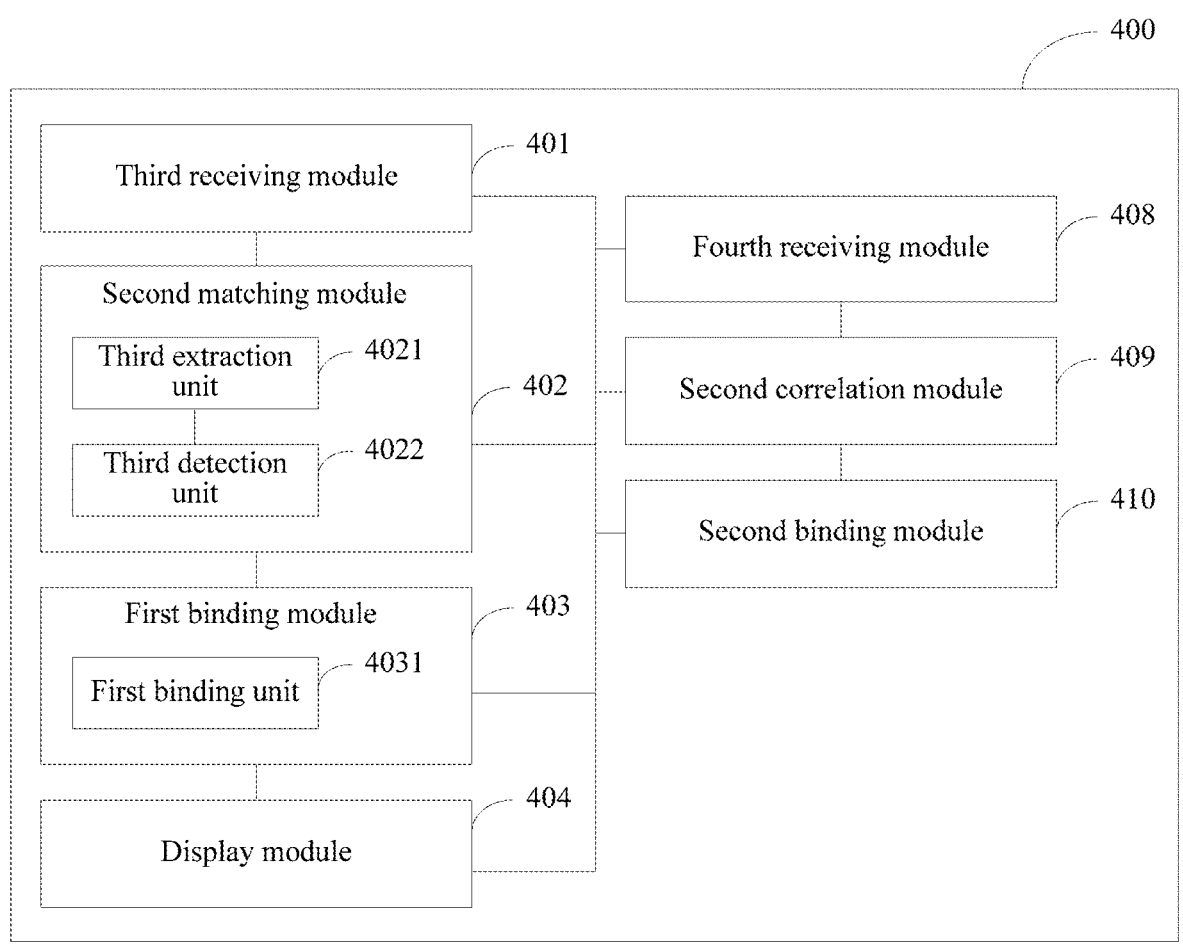
FIG. 16 is a schematic structural diagram of still another implementation manner of another message display apparatus according to an embodiment of the present invention.

In addition, when the first delivered information successfully matches the user name corresponding to the receiver terminal, as shown in FIG. 16, the apparatus 400 further includes:

a fourth receiving module 408, configured to: receive second delivered information, and extract key information from the second delivered information, where the second delivered information is delivered information received after the first delivered information is received;

a second correlation module 409, configured to perform semantic correlation analysis on the second delivered information and the first delivered information by using the name information or the appellation information in the first delivered information and the key information in the second delivered information; and a second binding module 410, configured to: when the second delivered information is semantically correlated with the first delivered information successfully, bind the user name corresponding to the receiver terminal and the second delivered information, and display a reminder message.

It should be noted that the first delivered information includes text delivered information or voice delivered information, and the second delivered information includes text delivered information or voice delivered information.

The message display apparatus further provided in this embodiment of the present invention can extract key information in delivery information, match between the key information and a user name that corresponds to a receiver terminal, bind the delivery information successfully matching the user name corresponding to the receiver terminal and the user name corresponding to the receiver terminal, and display a reminder message at the receiver terminal. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, semantic correlation analysis is performed on second delivered information and first delivered information. In this way, in a case in which name information and appellation information do not directly exist in the second delivered information, the second delivered information and the user name that corresponds to the receiver terminal are bound according to a successful correlation between the second delivered information and the first delivered information, so that the delivered information bound to the user name corresponding to the receiver terminal is obtained more accurately and more comprehensively.

Figure 17:
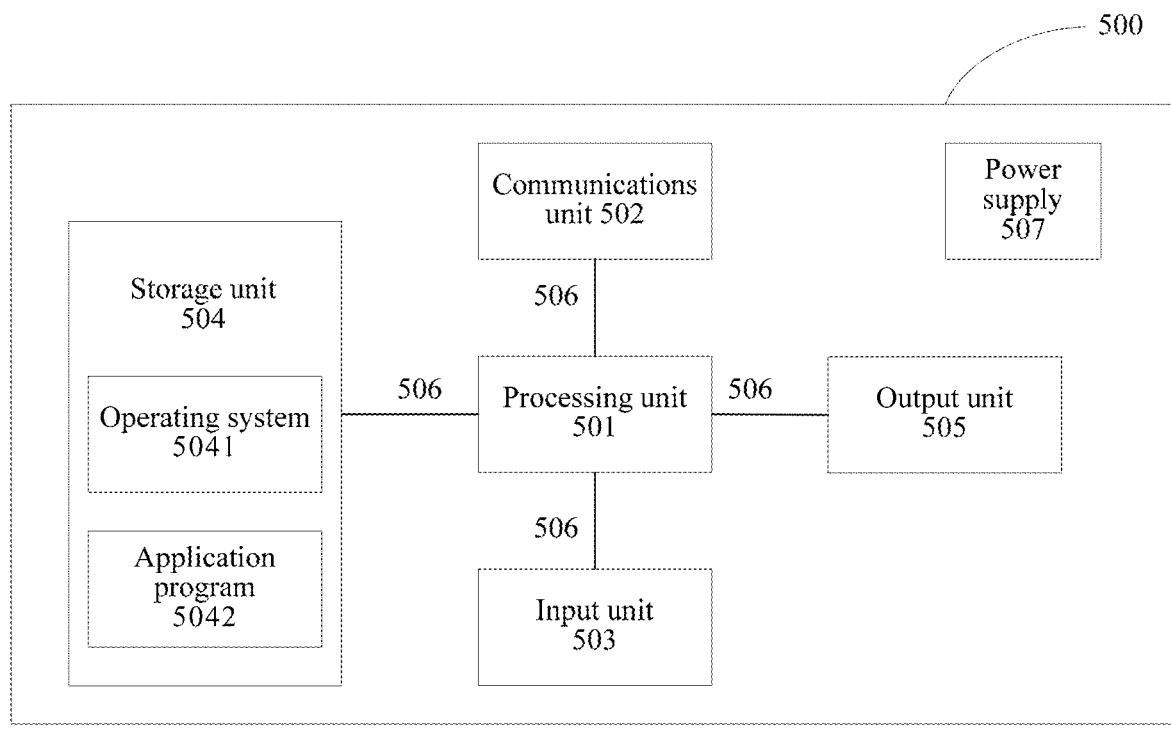
FIG. 17 is a schematic structural diagram of a message display device according to an embodiment of the present invention.

An embodiment of the present invention further provides a message display device 500. As shown in FIG. 17, the message display device 500 includes: at least one processing unit 501, for example, a CPU, at least one communications unit 502 or another input unit 503, a storage unit 504, an output unit 505, at least one communications bus 506, and a power supply 507. The communications bus 506 is configured to implement connection and communication between these components.

The processing unit 501 is a control center of the device 500, connects various parts of the entire device 500 by using interfaces and lines, and executes functions of the device 500 and/or processes data by running or executing a software program and/or a module stored in the storage unit, and invoking data stored in the storage unit 504. The processing unit 501 may include an integrated circuit (Integrated Circuit, IC), for example, include a single packaged IC, or include multiple connected ICs having a same function or different functions. For example, the processing unit 501 may include only a central processing unit (Central Processing Unit, CPU), or may include a combination of a GPU, a digital signal processor (Digital Signal Processor, DSP), and a control chip (for example, a baseband chip) in the communications unit. In an implementation manner of the present invention, the CPU may be a single computing core or may include multiple computing cores.

The communications unit 502 is configured to establish a communications channel, to enable the device 500 to connect to a remote server by using the communications channel, and to download media data from the remote server, or to upload media data to the remote server. The communications unit 502 may include a communications module, such as a wireless local area network (Wireless Local Area Network, wireless LAN) module, a Bluetooth module, or a baseband (Base Band) module, and a radio frequency (Radio Frequency, RF) circuit corresponding to the communications module, and is configured to perform wireless local area network communication, Bluetooth communication, infrared communication, and/or cellular communications system communication, for example, Wideband Code Division Multiple Access (Wideband Code Division Multiple Access, W-CDMA) and/or High Speed Downlink Packet Access (High Speed Downlink Packet Access, HSDPA). The communications module is configured to control communication of various components in the device 500, and may support direct memory access (Direct Memory Access).

In different implementation manners of the present invention, communications modules in the communications unit 502 usually appear in a form of an integrated circuit chip (Integrated Circuit Chip), can be combined selectively, and do not need to include all communications modules and corresponding antenna groups. For example, the communications unit 502 may include only a baseband chip, a radio frequency chip, and a corresponding antenna, to provide a communications function in a cellular communications system. The device 500 may be connected to a cellular network (Cellular Network) or the Internet (Internet) by means of a wireless communication connection, for example, wireless local area network access or WCDMA access, established by the communications unit 502. In some optional implementation manners of the present invention, the communications module, for example, the baseband module, in the communications unit 502 may be integrated into the processing unit 501.

The input unit 503 is configured to implement interaction between a user and the device 500 and/or input information into the device 500. For example, the input unit 503 may receive digit or character information entered by the user, to generate a signal input related to a user setting or function control. In a specific implementation manner of the present invention, the input unit 503 may be a touch panel, or may be another human-computer interaction interface, such as a physical input key or a microphone, or may be another external information capturing apparatus, for example, a camera. The touch panel, which is also referred to as a touchscreen or a touch screen, can collect an operation action of the user on or near the touch panel, for example, an operation action of the user on the touch panel or at a position near the touch panel by using any suitable object or accessory such as a finger or a stylus, and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to the processing unit 501. The touch controller may further receive and execute a command sent by the processing unit 501. In addition, the touch panel may be a resistive, capacitive, infrared (Infrared), or surface acoustic wave touch panel. In another implementation manner of the present invention, the physical input key used by the input unit 503 may include, but is not limited to, one or more of a physical keyboard, a functional key (such as a volume control key or a switch key), a trackball, a mouse, and a joystick. The input unit 503 in a form of a microphone may collect a voice entered by a user or an environment and convert the voice into a command, which can be executed by the processor 501, in a form of an electrical signal.

The storage unit 504 is configured to store a software program and a module, and the processing unit 501 executes various function applications of the device 500 and implements data processing by running the software program and the module that are stored in the storage unit 504. The storage unit 504 mainly includes a program storage area and a data storage area. The program storage area may store an operating system 5041, an application program 5042 such as a sound playback program and an image display program required by at least one function, and the like. The data storage area may store data (such as audio data and an address book) created according to use of the device 500, and the like. In a specific implementation manner of the present invention, the storage unit 504 may include a volatile memory, such as a nonvolatile random access memory (Nonvolatile Random Access Memory, NVRAM), a phase change RAM (Phase Change RAM, PRAM), or a magnetoresistive RAM (Magnetoresistive RAM, MRAM), and may further include a non-volatile memory, such as at least one magnetic disk storage device, an electrically erasable programmable read-only memory (Electrically Erasable Programmable Read-Only Memory, EEPROM), or a flash memory, for example, a NOR flash memory (NOR flash memory) or a NAND flash memory (NAND flash memory). The non-volatile memory stores the operation system 5041 and the application program 5042 that are executed by the processing unit 501. The processing unit 501 loads a running program and data from the non-volatile memory to a memory and stores digital content in a large quantity of storage apparatuses. The operating system 5041 includes various components and/or drivers that are used to control and manage conventional system tasks, such as memory management, storage device control, and power management, and to facilitate communication between various types of software and hardware. In an implementation manner of the present invention, the operating system may be an Android system, an iOS system, or a Windows operating system, or may be an embedded operating system of a Vxworks type.

The application program 5042 includes any application installed in the device 500, and includes, but is not limited to, a browser, an email, an instant message service, word processing, keyboard virtualization, a window widget (Widget), encryption, digital right management, speech recognition, speech replication, positioning (for example, a function provided by a global positioning system), music playback, and the like. The application program 5042 includes, but is not limited to, a first receiving module 301, a first matching module 302, a first determining module 303, a first sending module 304, a first extraction unit 3021, a first detection unit 3022, a first determining unit 3031, a first obtaining module 305, a first establishment module 306, a first storing module 307, a second extraction unit 3023, a second detection unit 3024, a second determining unit 3032, a second receiving module 308, a first correlation module 309, a second determining module 310, and a second sending module 311.

For specific implementation of modules and units in the application program 5042, refer to the corresponding modules and units in the embodiments shown in FIG. 9 to FIG. 12, and details are not described herein again.

The output unit 506 includes, but is not limited to, an image output unit and a sound output unit. The image output unit is configured to output texts, images, and/or videos. The image output unit may include a display panel. For example, the display panel may be configured by using an LCD (Liquid Crystal Display, liquid crystal display), an OLED (Organic Light-Emitting Diode, organic light-emitting diode), a field emission display (field emission display, FED), or the like. Alternatively, the image output unit may include a reflective display, for example, an electrophoretic (electrophoretic) display, or a display using a technology of interferometric modulation of light (Interferometric Modulation of Light). The image output unit may include a single display or multiple displays of different sizes. In a specific implementation manner of the present invention, the touch panel used by the input unit 503 may also be used as a display panel of the output unit 506. For example, after detecting a gesture operation of touching on or getting close to the touch panel, the touch panel transfers the touch operation to the processing unit 501, so as to determine a type of a touch event. Then, the processing unit 501 provides corresponding visual output on the display panel according to the type of the touch event. Although the input unit 503 and the output unit 506 may be used as two separate parts to implement input and output functions of the device 500, in some embodiments, the touch panel and the display panel may be integrated into a whole to implement the input and output functions of the device 500. For example, the image output unit may display various graphical user interfaces (Graphical User Interface, GUI) as virtual control components, which include, but are not limited to, a window, a scroll bar, an icon, and a clipboard, for the user to perform an operation by means of touch control.

The video output unit includes a digital-to-analog converter, configured to convert, from a digital format into an analog format, an audio signal that is output by the processing unit 501.

The power supply 507 is configured to supply power to different components of the device 500 to maintain running of the components. As general understanding, the power supply 507 may be a built-in battery, such as a common lithium-ion battery or a NiMH battery, or may include an external power supply, for example, an AC adapter, that directly supplies power to the device 500. In some implementation manners of the present invention, the power supply 507 may also have broader definitions, for example, may also include a power management system, a charging system, a power failure detection circuit, a power converter or inverter, a power status indicator (for example, a light emitting diode), and any other component related to generation, management, and distribution of electric energy for the wearable device 500.

Specifically, the input unit 503 is configured to receive first input information.

The processing unit 501 is configured to: extract key information from the first input information, and match between the key information in the first input information and a user name in a communication list; and configured to determine a target user name, where the target user name is a user name that successfully matches the key information in the first input information.

The communications unit 502 is configured to: bind the first input information and the target user name, and send, to a receiver terminal, the first input information and the target user name that are bound, so that the receiver terminal displays a reminder message according to the target user name, where the reminder message includes the target user name or identification information corresponding to the target user name.

Further, the key information includes name information or appellation information.

Further, the processing unit 501 is further configured to: perform semantic analysis on the key information extracted from the first input information, to extract the name information from the key information; configured to detect whether the name information is consistent with the user name in the communication list; and configured to determine the user name in the communication list that is consistent with the name information as the target user name.

In addition, the processing unit 501 is further configured to: obtain appellation information in historical input information and a user name corresponding to the historical input information; and configured to establish a correspondence between the appellation information in the historical input information and the user name according to the appellation information in the historical input information and the user name corresponding to the historical input information.

The storage unit 504 is configured to store the correspondence.

Further, the processing unit 501 is further configured to: perform semantic analysis on the key information extracted from the first input information, to extract the appellation information from the key information; configured to detect, according to the appellation information in the first input information, whether a user name that corresponds to the appellation information in the first input information exists in the communication list; and configured to: when the user name that corresponds to the appellation information in the first input information exists in the communication list, use the user name that corresponds to the appellation information in the first input information as the target user name.

The correspondence is stored in the communication list.

In addition, the input unit 503 is further configured to: receive second input information, and extract key information from the second input information, where the second input information is input information received after the first input information is received.

The processing unit 501 is further configured to perform semantic correlation analysis on the second input information and the first input information by using the name information or the appellation information in the first input information and the key information in the second input information; and configured to: when the second input information is semantically correlated with the first input information successfully, determine that the key information in the second input information successfully matches the target user name.

The communications unit 502 is further configured to: bind the second input information and the target user name, and send, to the receiver terminal, the second input information and the target user name that are bound, so that the receiver terminal displays a reminder message according to the target user name.

It should be noted that the first input information includes text input information or voice input information, and the second input information includes text input information or voice input information.

The message display device provided in this embodiment of the present invention can extract key information from input information, match between the key information and a user name in a communication list, bind the input information and the user name successfully matching the key information in the input information, and send, to a receiver terminal, the successfully matched user name and the input information that are bound, so that the receiver terminal displays a reminder message according to the successfully matched user name. Compared with the prior art in which unread information needs to be sequentially read from a large amount of unread information in a group, to search for input information related to a user, in the present invention, the key information in the input information is extracted, the key information is matched with the user name in the communication list, and the input information and the user name successfully matching the key information in the input information are bound, and are sent to the receiver terminal. After receiving the input information bound to the successfully matched user name, while displaying the input information, the receiver terminal also displays a reminder message indicating that the input information is related to the successfully matched user name, that is, a large amount of unread information carries reminder messages for reminding the user related to the unread information. The user can quickly obtain the input information related to the user from the large amount of unread information according to the related user reminded by the reminder message, thereby greatly reducing a time taken by the user to search the large amount of unread information for the input information related to the user. In addition, a more specific name of a person is obtained by extracting name information from the key information in the input information, which can omit a process in which matching is performed between an unrelated word and a user name, and reduce a time taken in the matching process, thereby improving efficiency of the matching process. In addition, a correspondence between commonly used appellation information and the user name is established according to historical input information, so that appellation information that is different from the user name but directs to the user name successfully matches the user name, which expands a successful matching range on the basis of ensuring an accuracy rate of successful matching. In addition, semantic correlation analysis is performed on second input information and first input information. In this way, in a case in which name information and appellation information do not directly exist in the second input information, a target user name that can be bound to the second input information can be determined according to a successful correlation between the second input information and the first input information, so that the user name that should be bound to the input information is obtained more accurately and more comprehensively.

Figure 18:
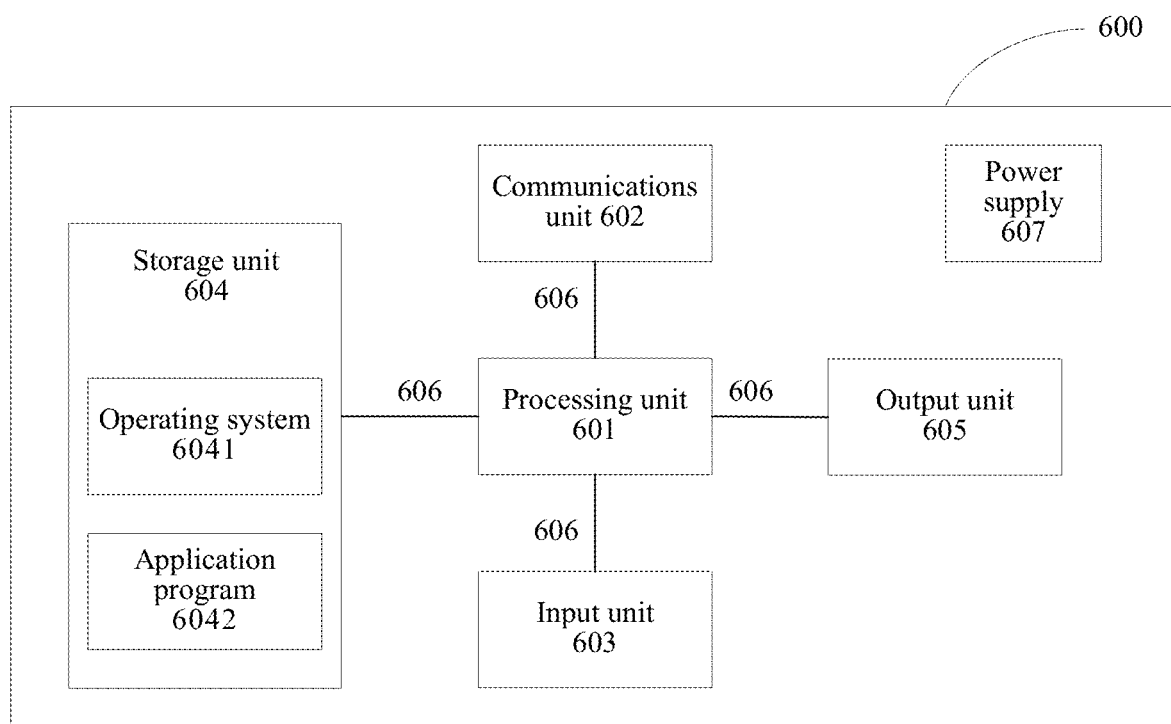
FIG. 18 is a schematic structural diagram of another message display device according to an embodiment of the present invention.

An embodiment of the present invention further provides a device 600. As shown in FIG. 18, the device 600 includes: at least one processing unit 601, for example, a CPU, at least one communications unit 602 or another input unit 603, a storage unit 604, an output unit 605, at least one communications bus 606, and a power supply 607. The communication bus 606 is configured to implement connection and communication between these components.

The processing unit 601 is a control center of the device 600, connects various parts of the entire device 600 by using interfaces and lines, and executes functions of the device 600 and/or processes data by running or executing a software program and/or a module stored in the storage unit, and invoking data stored in the storage unit 604. The processing unit 601 may include an integrated circuit (Integrated Circuit, IC), for example, include a single packaged IC, or include multiple connected ICs having a same function or different functions. For example, the processing unit 601 may include only a central processing unit (Central Processing Unit, CPU), or may include a combination of a GPU, a digital signal processor (Digital Signal Processor, DSP), a control chip (for example, a baseband chip) in the communications unit. In an implementation manner of the present invention, the CPU may be a single computing core or may include multiple computing cores.

The communications unit 602 is configured to establish a communications channel, to enable the device 600 to connect to a remote server by using the communications channel, and to download media data from the remote server, or to upload media data to the remote server. The communications unit 602 may include a communications module, such as a wireless local area network (Wireless Local Area Network, wireless LAN) module, a Bluetooth module, or a baseband (Base Band) module, and a radio frequency (Radio Frequency, RF) circuit corresponding to the communications module, and is configured to perform wireless local area network communication, Bluetooth communication, infrared communication, and/or cellular communications system communication, for example, Wideband Code Division Multiple Access (Wideband Code Division Multiple Access, W-CDMA) and/or High Speed Downlink Packet Access (High Speed Downlink Packet Access, HSDPA). The communications module is configured to control communication of various components in the device 600, and may support direct memory access (Direct Memory Access).

In different implementation manners of the present invention, communications modules in the communications unit 602 usually appear in a form of an integrated circuit chip (Integrated Circuit Chip), can be combined selectively, and do not need to include all communications modules and corresponding antenna groups. For example, the communications unit 602 may include only a baseband chip, a radio frequency chip, and a corresponding antenna, to provide a communications function in a cellular communications system. The device 600 may be connected to a cellular network (Cellular Network) or the Internet (Internet) by means of a wireless communication connection, for example, wireless local area network access or WCDMA access, established by the communications unit 602. In some optional implementation manners of the present invention, the communications module, for example, the baseband module, in the communications unit 602 may be integrated into the processing unit 601.

The input unit 603 is configured to implement interaction between a user and the device 600 and/or input information into the device 600. For example, the input unit 603 may receive digit or character information entered by the user, to generate a signal input related to a user setting or function control. In a specific implementation manner of the present invention, the input unit 603 may be a touch panel, or may be another human-computer interaction interface, such as a physical input key or a microphone, or may be another external information capturing apparatus, for example, a camera. The touch panel, which is also referred to as a touchscreen or a touch screen, can collect an operation action of the user on or near the touch panel, for example, an operation action of the user on the touch panel or at a position near the touch panel by using any suitable object or accessory such as a finger or a stylus, and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to the processing unit 601. The touch controller may further receive and execute a command sent by the processing unit 601. In addition, the touch panel may be a resistive, capacitive, infrared (Infrared), or surface acoustic wave touch panel. In another implementation manner of the present invention, the physical input key used by the input unit 603 may include, but is not limited to, one or more of a physical keyboard, a functional key (such as a volume control key or a switch key), a trackball, a mouse, and a joystick. The input unit 603 in a form of a microphone may collect a voice entered by a user or an environment and convert the voice into a command, which can be executed by the processor 601, in a form of an electrical signal.

The storage unit 604 is configured to store a software program and a module, and the processing unit 601 executes various function applications of the device 600 and implements data processing by running the software program and the module that are stored in the storage unit 604. The storage unit 604 mainly includes a program storage area and a data storage area. The program storage area may store an operating system 6041, an application program 6042 required by at least one function (such as a sound playback program and an image display program), and the like. The data storage area may store data (such as audio data and an address book) created according to use of the device 600, and the like. In a specific implementation manner of the present invention, the storage unit 604 may include a volatile memory, such as a nonvolatile dynamic random access memory (Nonvolatile Random Access Memory, NVRAM), a phase change RAM (Phase Change RAM, PRAM), or a magnetoresistive RAM (Magnetoresistive RAM, MRAM), and may further include a non-volatile memory, such as at least one magnetic disk storage device, an electrically erasable programmable read-only memory (Electrically Erasable Programmable Read-Only Memory, EEPROM), or a flash memory, for example, a NOR flash memory (NOR flash memory) or a NAND flash memory (NAND flash memory).

The non-volatile memory stores the operation system 6041 and the application program 6042 that are executed by the processing unit 601. The processing unit 601 loads a running program and data from the non-volatile memory to a memory and stores digital content in a large quantity of storage apparatuses. The operating system 6041 includes various components and/or drivers that are used to control and manage conventional system tasks, such as memory management, storage device control, and power management, and to facilitate communication between various types of software and hardware. In an implementation manner of the present invention, the operating system may be an Android system, an iOS system, or a Windows operating system, or may be an embedded operating system of a Vxworks type.

The application program 6042 includes any application installed in the device 600, and includes, but is not limited to, a browser, an email, an instant message service, word processing, keyboard virtualization, a window widget (Widget), encryption, digital right management, speech recognition, speech replication, positioning (for example, a function provided by a global positioning system), music playback, and the like. The application program 6042 includes, but is not limited to, a third receiving module 401, a second matching module 402, a first binding module 403, a display module 404, a third extraction unit 4021, a third detection unit 4022, a first binding unit 4031, a second obtaining module 405, a second establishment module 406, a second storing module 407, a fourth extraction unit 4023, a fourth detection unit 4024, a second binding unit 4032, a fourth receiving module 408, a second correlation module 409, and a second binding module 410.

For specific implementation of modules and units in the application program 6042, refer to the corresponding modules and units in the embodiments shown in FIG. 13 to FIG. 16, and details are not described herein again.

The output unit 606 includes, but is not limited to, an image output unit and a sound output unit. The image output unit is configured to output texts, images, and/or videos. The image output unit may include a display panel. For example, the display panel may be configured by using an LCD (Liquid Crystal Display, liquid crystal display), an OLED (Organic Light-Emitting Diode, organic light-emitting diode), a field emission display (field emission display, FED), or the like. Alternatively, the image output unit may include a reflective display, for example, an electrophoretic (electrophoretic) display, or a display using a technology of interferometric modulation of light (Interferometric Modulation of Light). The image output unit may include a single display or multiple displays of different sizes. In a specific implementation manner of the present invention, the touch panel used by the input unit 603 may also be used as a display panel of the output unit 606. For example, after detecting a gesture operation of touching on or getting close to the touch panel, the touch panel transfers the touch operation to the processing unit 601, so as to determine a type of a touch event. Then, the processing unit 601 provides corresponding visual output on the display panel according to the type of the touch event. Although the input unit 603 and the output unit 606 may be used as two separate parts to implement input and output functions of the device 600, in some embodiments, the touch panel and the display panel may be integrated into a whole to implement the input and output functions of the device 600. For example, the image output unit may display various graphical user interfaces (Graphical User Interface, GUI) as virtual control components, which include, but are not limited to, a window, a scroll bar, an icon, and a clipboard, for the user to perform an operation by means of touch control.

The video output unit includes a digital-to-analog converter, configured to convert, from a digital format into an analog format, an audio signal that is output by the processing unit 601.

The power supply 607 configured to supply power to different components of the device 600 to maintain running of the components. As general understanding, the power supply 607 may be a built-in battery, such as a common lithium-ion battery or a NiMH battery, or may include an external power supply, for example, an AC adapter, that directly supplies power to the device 600. In some implementation manners of the present invention, the power supply 607 may also have broader definitions, for example, may also include a power management system, a charging system, a power failure detection circuit, a power converter or inverter, a power status indicator (for example, a light emitting diode), and any other component related to generation, management, and distribution of electric energy for the device 600.

Specifically, the communications unit 602 is configured to receive first delivered information.

The processing unit 601 is configured to: extract key information from the first delivered information, and match between the key information in the first delivered information and a user name that corresponds to a receiver terminal; configured to bind the user name that corresponds to the receiver terminal and the first delivered information that successfully match each other; and configured to display a reminder message, where the reminder message includes the user name corresponding to the receiver terminal or identification information corresponding to the user name corresponding to the receiver terminal.

Further, the key information includes name information or appellation information.

Further, the processing unit 601 is further configured to: perform semantic analysis on the key information extracted from the first delivered information, to extract the name information from the key information; configured to detect whether the name information is consistent with the user name corresponding to the receiver terminal; and configured to: when the name information in the first delivered information is consistent with the user name corresponding to the receiver terminal, bind the first delivered information and the user name that corresponds to the receiver terminal.

In addition, the processing unit 601 is further configured to obtain appellation information in historical delivered information sent to the receiver terminal; establish, according to the appellation information in the historical delivered information, a correspondence between the appellation information in the historical delivered information and the user name that corresponds to the receiver terminal.

The storage unit 604 is configured to store the correspondence.

Further, the processing unit 601 is further configured to: perform semantic analysis on the key information extracted from the first delivered information, to extract the appellation information from the key information; configured to detect, according to the appellation information in the first delivered information, whether the appellation information in the first delivered information corresponds to the user name corresponding to the receiver terminal; and configured to: when the appellation information in the first delivered information corresponds to the user name corresponding to the receiver terminal, bind the first delivered information and the user name that corresponds to the receiver terminal.

In addition, when the first delivered information successfully matches the user name corresponding to the receiver terminal, the communications unit 602 is further configured to: receive second delivered information, and extract key information from the second delivered information, where the second delivered information is delivered information received after the first delivered information is received.

The processing unit 601 is further configured to perform semantic correlation analysis on the second delivered information and the first delivered information by using the name information or the appellation information in the first delivered information and the key information in the second delivered information; and configured to: when the second delivered information is semantically correlated with the first delivered information successfully, bind the user name corresponding to the receiver terminal and the second delivered information, and display a reminder message.

It should be noted that the first delivered information includes text delivered information or voice delivered information, and the second delivered information includes text delivered information or voice delivered information.

The message display device further provided in this embodiment of the present invention can extract key information from delivered information, match between the key information and a user name that corresponds to a receiver terminal, bind the delivered information successfully matching the user name corresponding to the receiver terminal and the user name corresponding to the receiver terminal, and display a reminder message on the receiver terminal. Compared with the prior art in which unread information needs to be sequentially read from a large amount of unread information in a group, to search for delivered information related to a user, in the present invention, the key information in the delivered information is extracted, the key information is matched with the user name that corresponds to the receiver terminal, the delivered information successfully matching the user name corresponding to the receiver terminal is bound to the user name corresponding to the receiver terminal, and the receiver terminal also displays the reminder message while displaying the delivered information, that is, a large amount of unread information displayed on the receiver terminal carries reminder messages for reminding the user related to the unread information. The user can quickly obtain the delivered information related to the user from the large amount of unread information according to the reminder message, thereby greatly reducing a time taken by the user to search the large amount of unread information for the delivered information related to the user. In addition, a more specific name or appellation of a person is obtained by extracting name information from the key information in the delivered information, which can omit a process in which matching is performed between an unrelated word and the user name corresponding to the receiver terminal, and reduce a time taken in the matching process, thereby improving efficiency of the matching process. In addition, a correspondence between commonly used appellation information and the user name that corresponds to the receiver terminal is established according to historical delivered information, so that appellation information that is different from the user name corresponding to the receiver terminal but directs to the user name successfully matches the user name corresponding to the receiver terminal, which expands a successful matching range on the basis of ensuring an accuracy rate of successful matching. In addition, semantic correlation analysis is performed on second delivered information and first delivered information. In this way, in a case in which name information and appellation information do not directly exist in the second delivered information, the second delivered information and the user name that corresponds to the receiver terminal are bound according to a successful correlation between the second delivered information and the first delivered information, so that the delivered information bound to the user name corresponding to the receiver terminal is obtained more accurately and more comprehensively.

The embodiments in this specification are all described in a progressive manner, for same or similar parts in the embodiments, reference may be made to these embodiments, and each embodiment focuses on a difference from other embodiments. Especially, apparatus and device embodiments are basically similar to a method embodiment, and therefore are described briefly. For related parts, refer to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A message display method for use with a messaging application, the message display method comprising:
   receiving an identifier of a user of the messaging application;
   receiving first delivered information, wherein the first delivered information comprises messages from other users of the messaging application;
   extracting words from the first delivered information;
   performing semantic analysis on the words to identify a first portion of the messages that is associated with the user and a second portion of the messages that is not associated with the user; and
   graphically displaying a reminder message for each message within the first portion of the messages to the user, wherein the reminder message for each message within the first portion of the messages comprises first textual content comprising a user name and second textual content indicating that the message corresponds to the user, wherein the first textual content and the second textual content are different, wherein the messaging application comprises a group messaging application, wherein the user of the messaging application and the other users of the messaging application belong to a same group within the group messaging application, wherein the semantic analysis identifies a name, a first user name, a nickname, or a pronoun associated with the user within the words that are extracted from the first delivered information, and wherein the semantic analysis identifies the first portion of the messages without use of a special character before or after the name, the first user name, the nickname, or the pronoun associated with the user.

2. The message display method of claim 1, wherein the semantic analysis identifies appellation information in the words from the first delivered information, and wherein before receiving the first delivered information, the message display method comprises:
   obtaining historical appellation information in historical delivered information;
   establishing, according to the historical appellation information in the historical delivered information, a correspondence between the historical appellation information in the historical delivered information and the user of the messaging application; and
   storing the correspondence.

3. The message display method of claim 1, wherein the first portion of the messages that is associated with the user is received from a plurality of different users within the other users.

4. The message display method of claim 1, wherein the method is implemented by a receiving device that is coupled to a network side server and that is associated with the user of the messaging application.

5. The message display method of claim 4, wherein the receiving device receives messages from different sending devices.

6. A message display device associated with a user of a messaging application, the message display device comprising:
a processor; and
a memory configured to store instructions, that when executed by the processor, cause the message display device to:
receive first delivered information, wherein the first delivered information comprises messages from other users of the messaging application;
extract words from the first delivered information;
perform semantic analysis on the words to identify a first portion of the messages that is associated with the user and a second portion of the messages that is not associated with the user; and
graphically display a reminder message for each message within the first portion of the messages to the user, wherein the reminder message for each message within the first portion of the messages comprises first textual content comprising a user name and second textual content indicating that the message corresponds to the user, wherein the first textual content and the second textual content are different, wherein the messaging application comprises a group messaging application, wherein the user of the messaging application and the other users of the messaging application belong to a same group within the group messaging application, wherein the semantic analysis identifies a name, a first user name, a nickname, or a pronoun associated with the user within the words that are extracted from the first delivered information, and wherein the semantic analysis identifies the first portion of the messages without use of special character before or after the name, the first user name, the nickname, or the pronoun associated with the user.

7. The message display device of claim 6, further comprising a non-transitory computer-readable storage medium coupled to the processor, and wherein the message display device is further configured to:
obtain historical appellation information in historical delivered information; and
establish, according to the historical appellation information in the historical delivered information, a correspondence between the historical appellation information in the historical delivered information and the user of the messaging application, and
wherein the non-transitory computer-readable storage medium is further configured to store the correspondence.

8. A network side server that is configured to implement a group messaging application, the network side server comprising:
a memory comprising instructions; and
a processor coupled to the memory and configured to execute the instructions to cause the network side server to:
receive an indication of a user of the group messaging application;
receive messages comprising words from other users of the group messaging application;
extract words from the messages;
perform semantic analysis on the words to identify a first portion of the messages that is associated with the user and a second portion of the messages that is not associated with the user; and
send reminder messages to a receiving device of the user, wherein the reminder messages correspond to the first portion of the messages that is associated with the user, wherein the reminder messages are associated with at least two different message senders, wherein each of the reminder messages comprises first textual content comprising a user name and second textual content indicating that the reminder message corresponds to the user, wherein the first textual content and the second textual content are different, wherein the user of the group messaging application and the other users of the group messaging application belong to a same group within the group messaging application, wherein the semantic analysis identifies a name, a first user name, a nickname, or a pronoun associated with the user within the words that are extracted from the messages, and wherein the semantic analysis identifies the first portion of the messages without use of a special character before or after the name, the first user name, the nickname, or the pronoun associated with the user.

9. The network side server of claim 8, wherein the semantic analysis identifies name information in the words from the messages from the other users.

10. The network side server of claim 8, wherein the semantic analysis identifies appellation information in the words from the messages of the other users.

11. The network side server of claim 8, wherein the group messaging application comprises a group texting application, and wherein the user and the other users belong to a same text group.

12. The network side server of claim 8, wherein the second textual content comprises a plurality of words.

* * * * *